United States Patent
Sano et al.

(10) Patent No.: US 9,310,582 B2
(45) Date of Patent: Apr. 12, 2016

(54) IMAGE PICK-UP LENS, IMAGE PICK-UP DEVICE, PORTABLE TERMINAL AND DIGITAL INSTRUMENT

(75) Inventors: Eigo Sano, Hino (JP); Keiko Yamada, Sakai (JP)

(73) Assignee: Konica Minolta, Inc., Tokyo (JP)

(*) Notice: Subject to any disclaimer, the term of this patent is extended or adjusted under 35 U.S.C. 154(b) by 79 days.

(21) Appl. No.: 14/345,152

(22) PCT Filed: Sep. 10, 2012

(86) PCT No.: PCT/JP2012/073063
§ 371 (c)(1),
(2), (4) Date: Mar. 14, 2014

(87) PCT Pub. No.: WO2013/039035
PCT Pub. Date: Mar. 21, 2013

(65) Prior Publication Data
US 2014/0340568 A1    Nov. 20, 2014

(30) Foreign Application Priority Data

Sep. 14, 2011  (JP) .................... 2011-200937
Sep. 29, 2011  (JP) .................... 2011-214112

(51) Int. Cl.
| | | |
|---|---|---|
| G02B 9/60 | (2006.01) | |
| G02B 7/02 | (2006.01) | |
| G02B 13/00 | (2006.01) | |
| G02B 13/04 | (2006.01) | |
| H04N 5/225 | (2006.01) | |
| H04N 5/357 | (2011.01) | |

(52) U.S. Cl.
CPC *G02B 7/021* (2013.01); *G02B 9/60* (2013.01); *G02B 13/0045* (2013.01); *G02B 13/04* (2013.01); *H04N 5/2254* (2013.01); *H04N 5/3572* (2013.01)

(58) Field of Classification Search
CPC .............. G02B 9/60; G02B 9/62; G02B 9/64; G02B 13/0045
USPC .................... 359/713, 714, 754–758, 763
See application file for complete search history.

(56) References Cited

U.S. PATENT DOCUMENTS

| | | | |
|---|---|---|---|
| 2010/0053776 A1 | 3/2010 | Tanaka et al. | |
| 2010/0253829 A1 | 10/2010 | Shinohara | |

(Continued)

FOREIGN PATENT DOCUMENTS

| | | |
|---|---|---|
| CN | 201503515 | 6/2010 |
| CN | 101819315 | 9/2010 |
| CN | 102047165 | 5/2011 |

(Continued)

*Primary Examiner* — Darryl J Collins
(74) *Attorney, Agent, or Firm* — Cozen O'Connor

(57) ABSTRACT

Provided is an image pickup lens that despite being small is favorably corrected for aberrations and has a five element configuration that is wide angle and has a bright F-number also provided is an image pickup device and a portable terminal using the image pickup lens. The image surface side of the fifth lens has an aspherical shape, has an inflection point at a position other than a position that intersects with the light axis, and satisfies the following formulae: $-5.0<(r1+r2)/(r1-r2)\le-1.0$ (1); $0.90<f1/f<1.70$ (2); $0.35<\Sigma DL13/f<0.55$ (3). Provided that r1: curvature radius of the first lens object side surface, r2: curvature radius of the first lens image side surface, f1: focal distance of the first lens, f: focal distance of the entire image pickup lens system, $\Sigma DL13$: distance on the optical axis from object side surface of the first lens to image side surface of the third lens.

22 Claims, 20 Drawing Sheets

(56) References Cited

U.S. PATENT DOCUMENTS

2011/0164327 A1 7/2011 Sato
2013/0188263 A1* 7/2013 Tsai et al. .................... 359/714

FOREIGN PATENT DOCUMENTS

| | | |
|---|---|---|
| JP | 57-164708 | 10/1982 |
| JP | 2010-079296 | 4/2010 |
| JP | 2010-197665 | 9/2010 |
| JP | 2010-224521 | 10/2010 |
| JP | 2010-256608 | 11/2010 |
| JP | 2010-262269 | 11/2010 |
| JP | 2010-262270 | 11/2010 |
| JP | 2011-095513 | 5/2011 |
| JP | 2011-141396 | 7/2011 |
| JP | 2012-008164 | 1/2012 |

* cited by examiner

FIG. 6
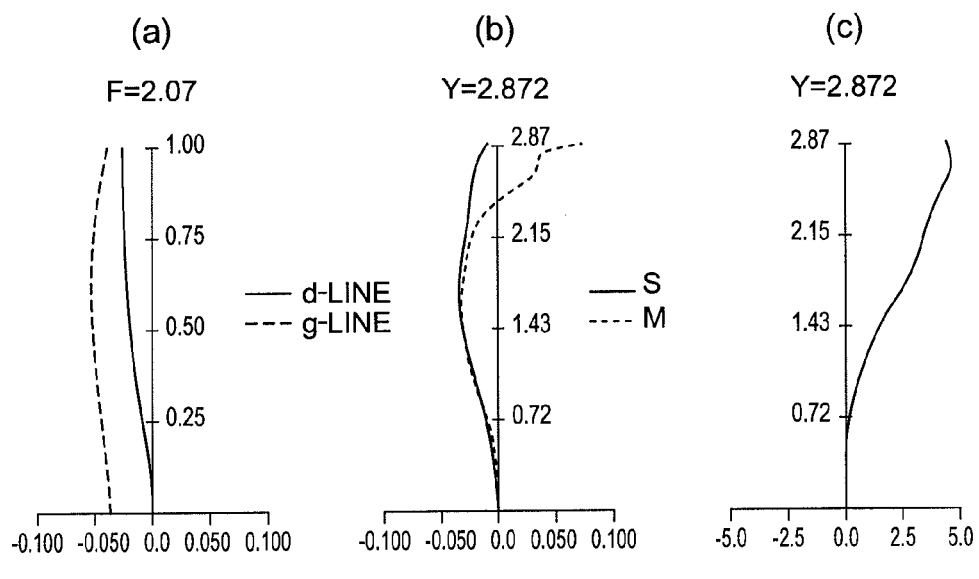
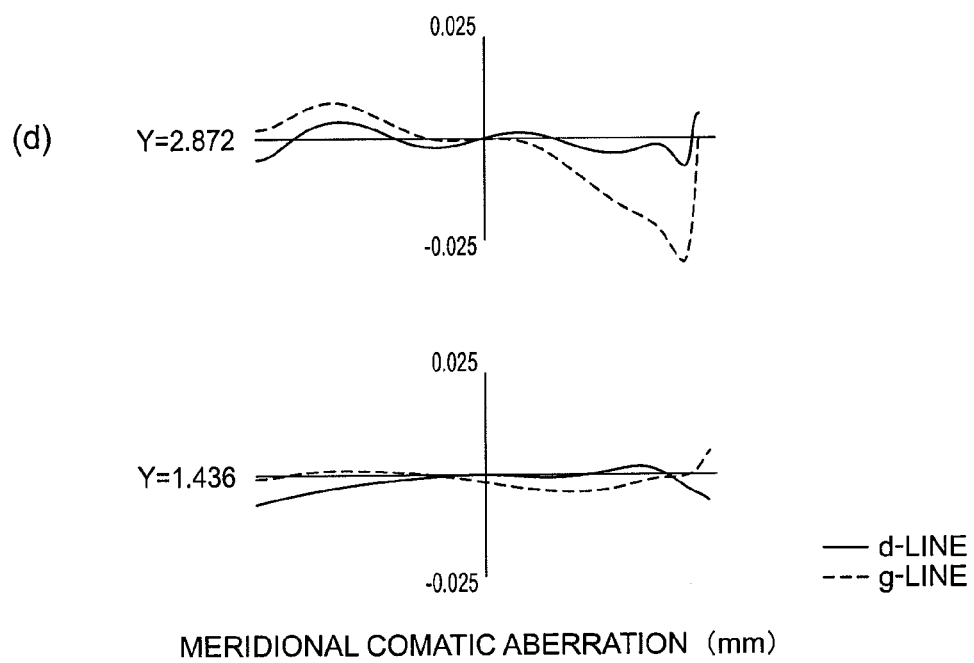
MERIDIONAL COMATIC ABERRATION (mm)

FIG. 8
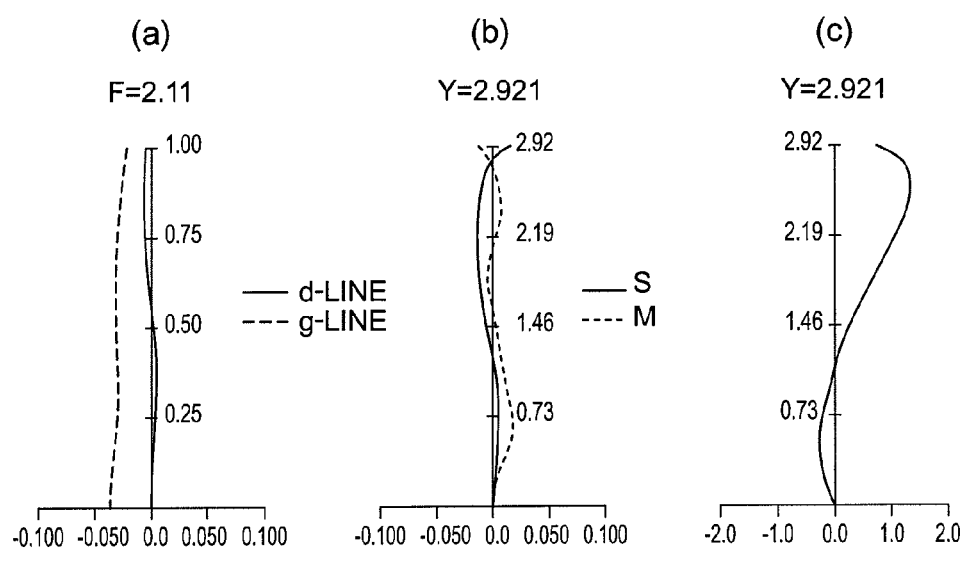
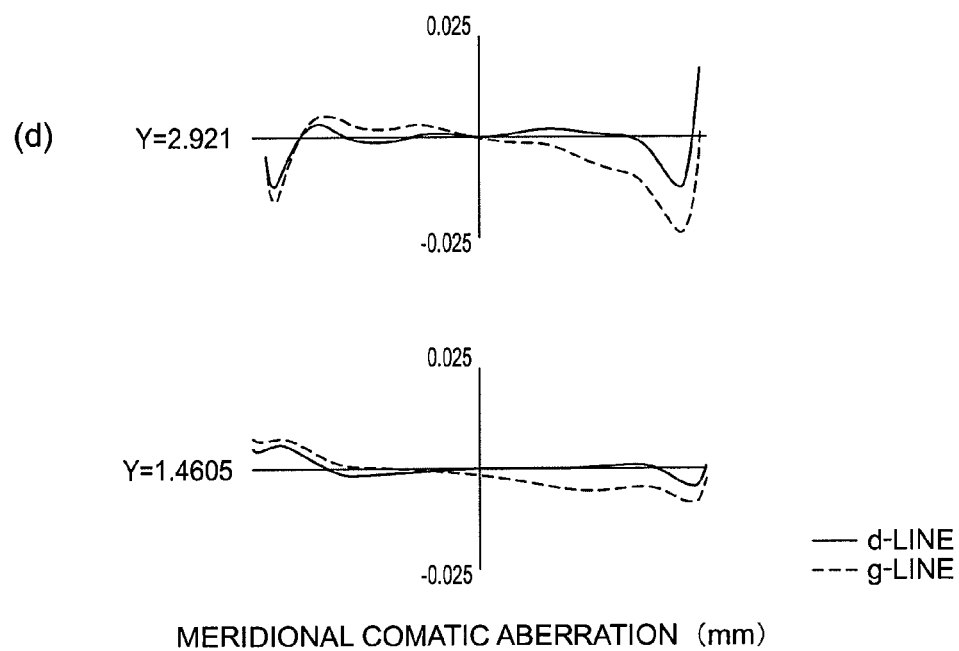
MERIDIONAL COMATIC ABERRATION (mm)

FIG. 10
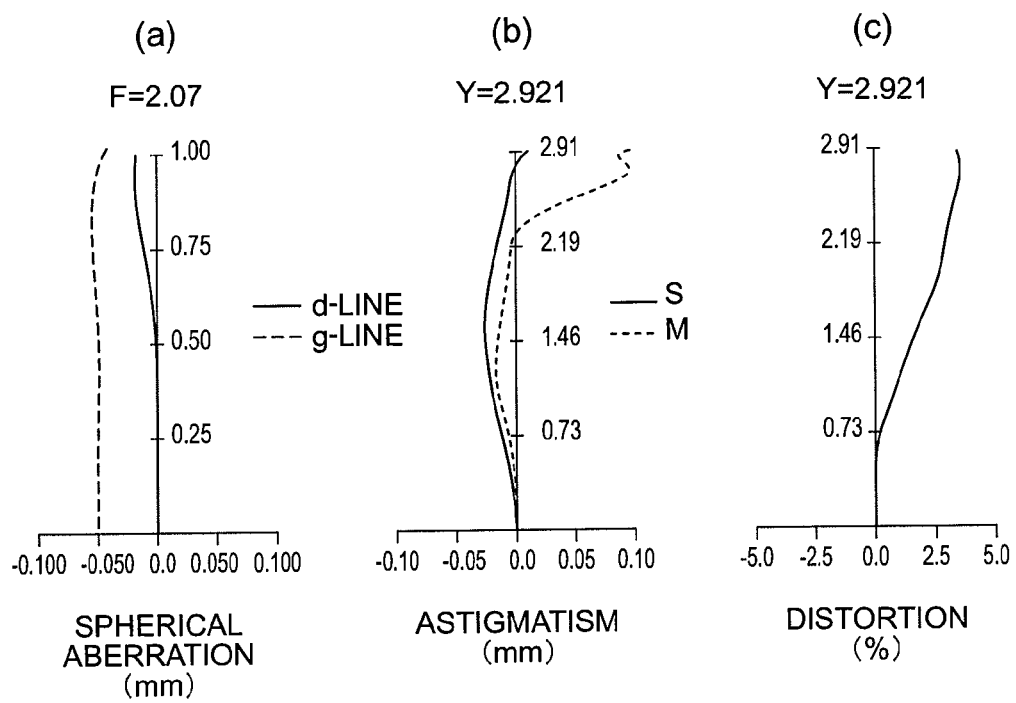
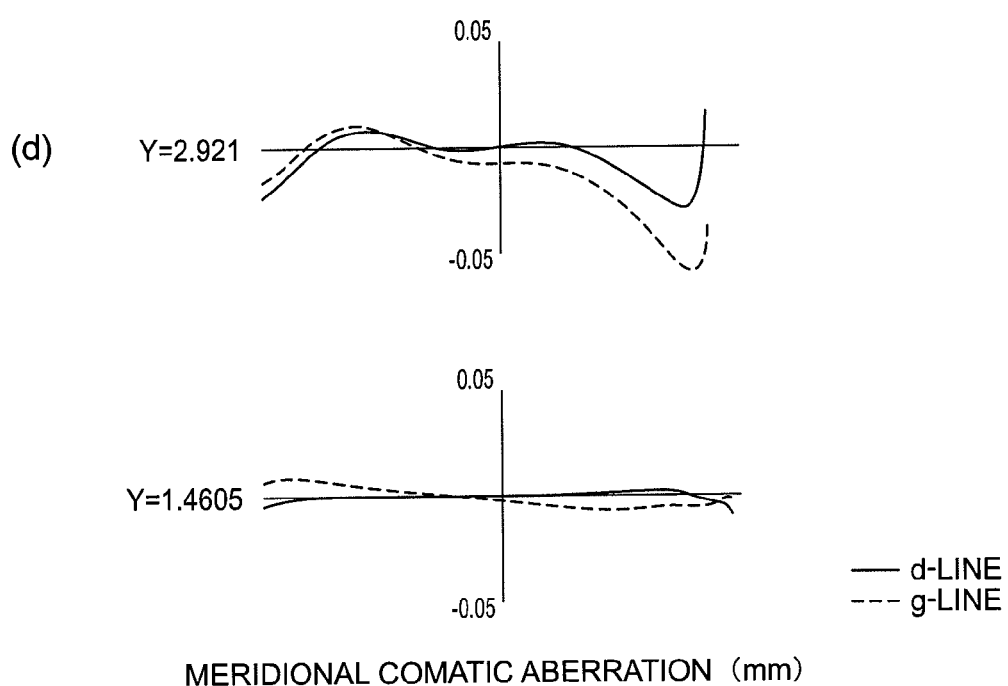
MERIDIONAL COMATIC ABERRATION (mm)

FIG. 12
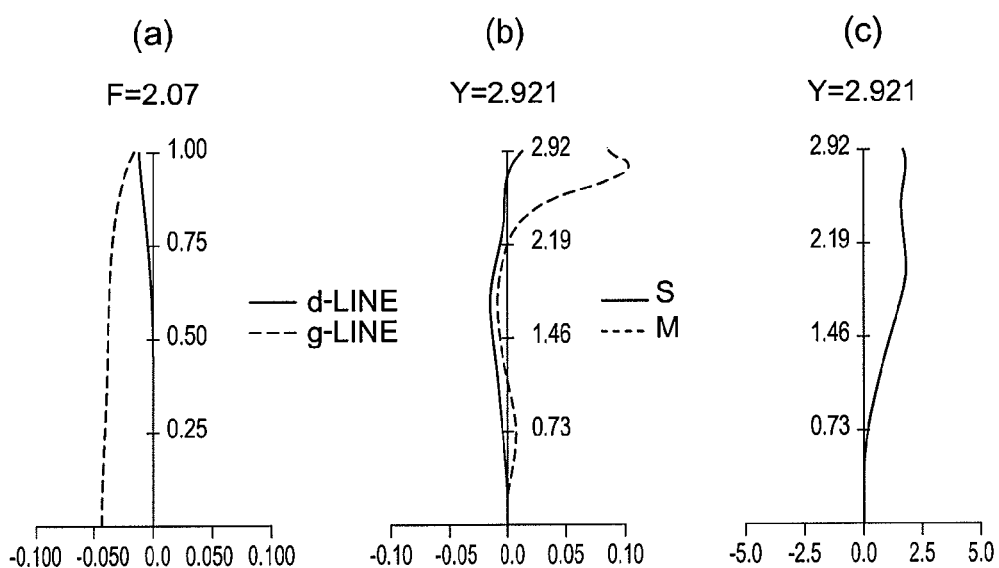
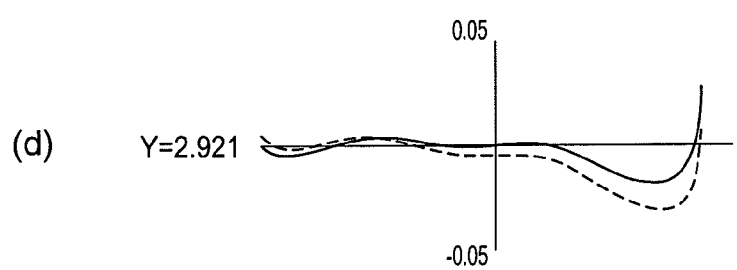
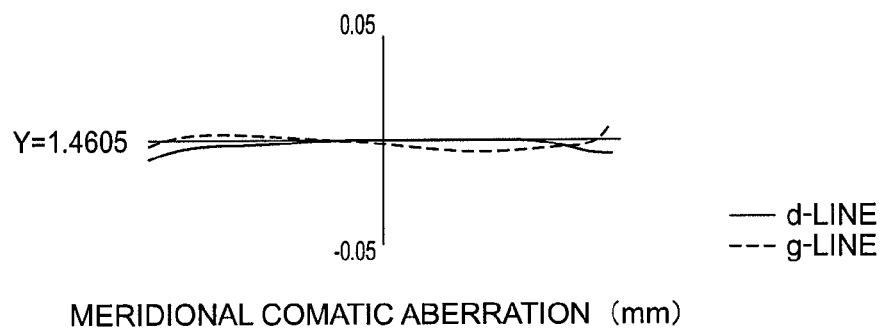
MERIDIONAL COMATIC ABERRATION (mm)

FIG. 14
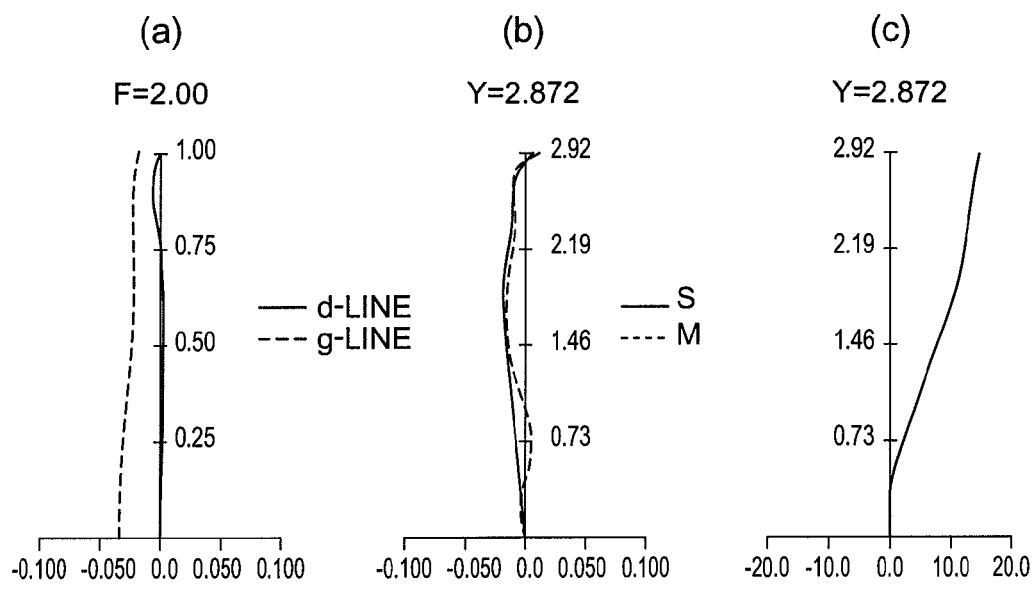
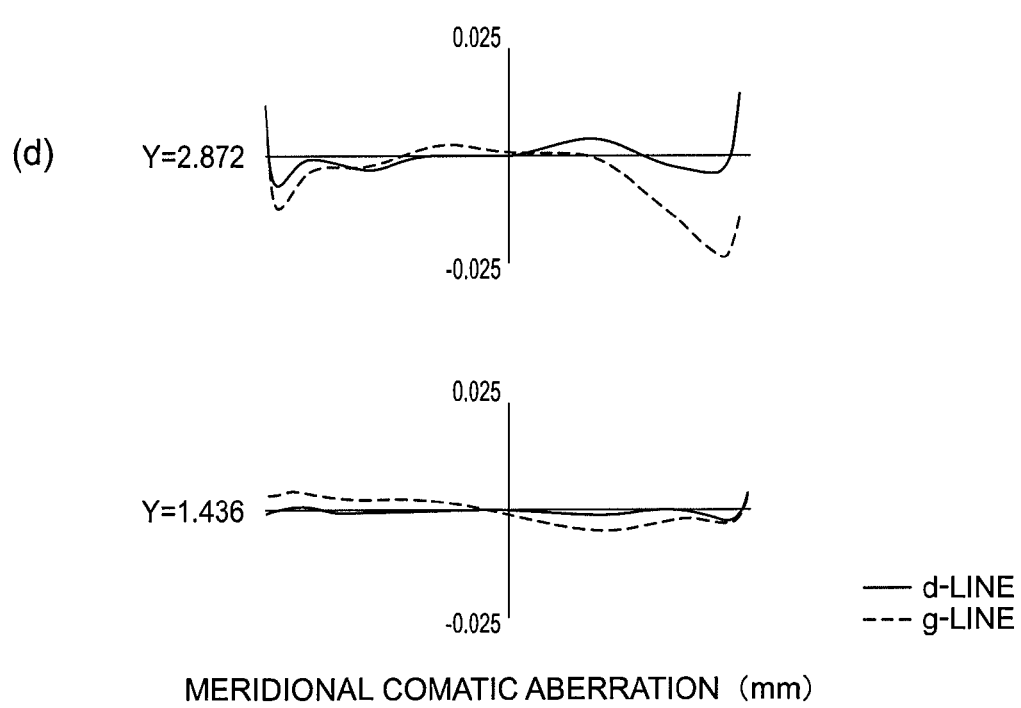

FIG. 16
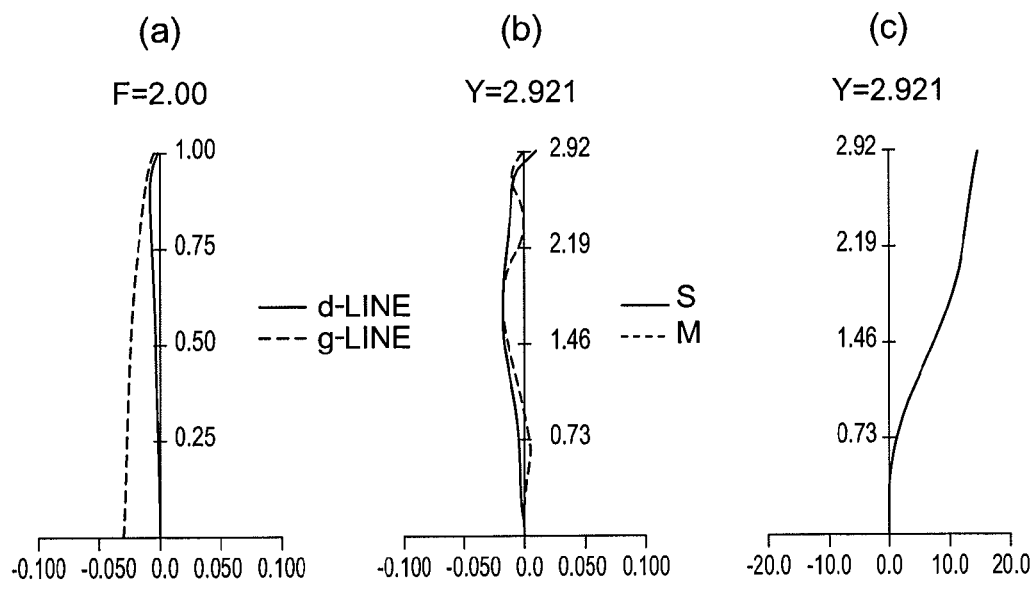
(a) F=2.00 SPHERICAL ABERRATION (mm)
(b) Y=2.921 ASTIGMATISM (mm)
(c) Y=2.921 DISTORTION (%)
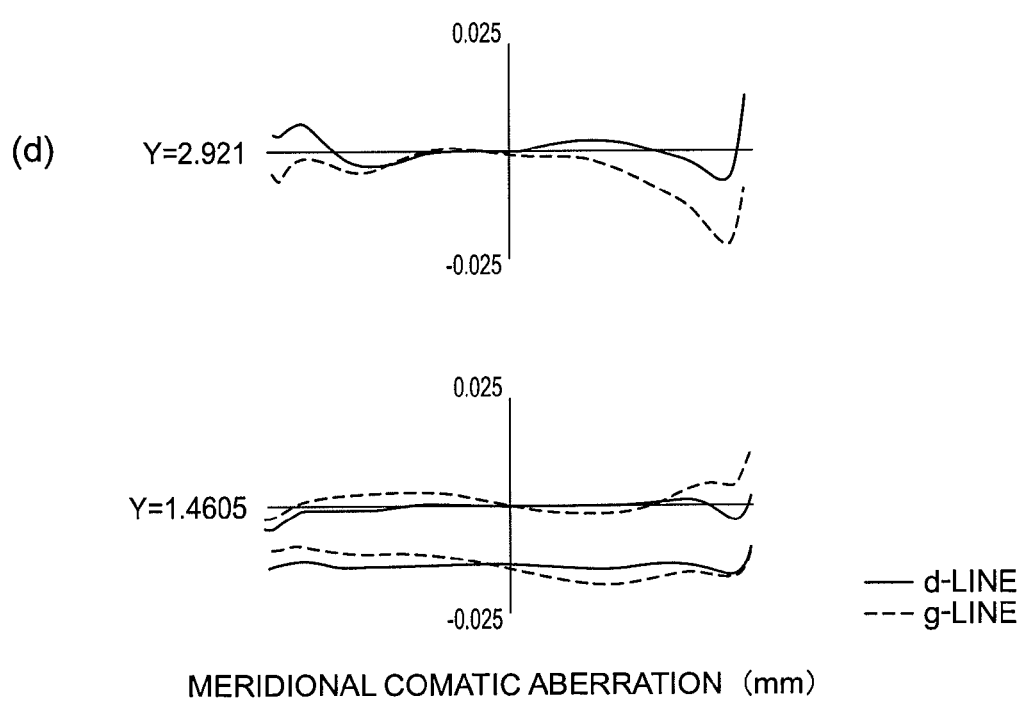
(d) MERIDIONAL COMATIC ABERRATION (mm)

FIG. 18
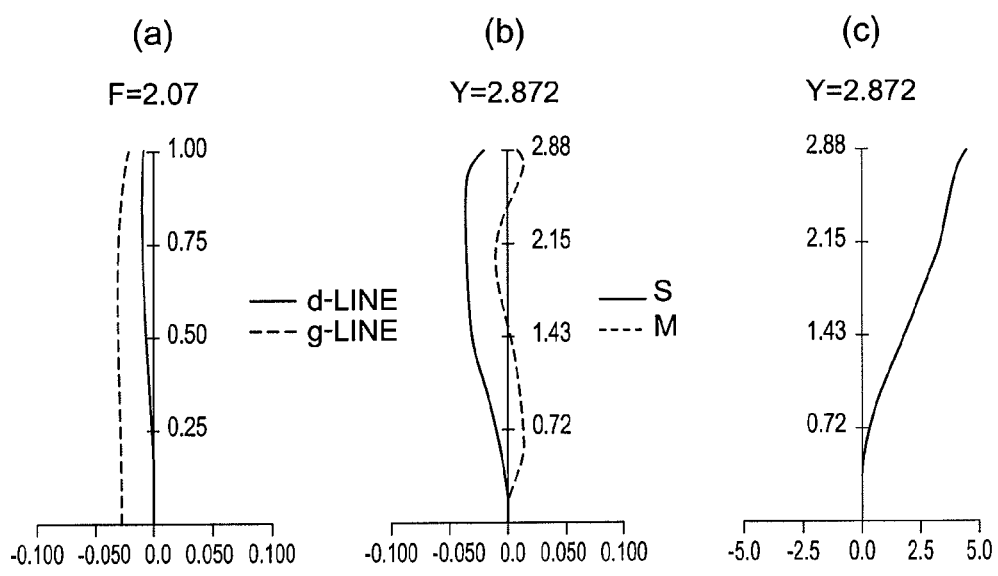
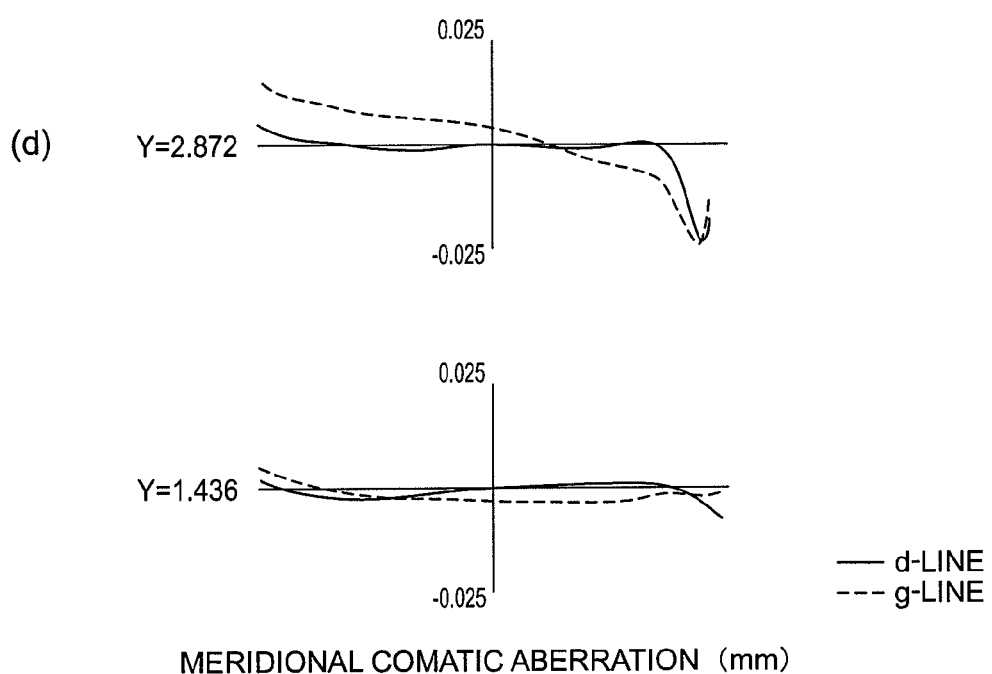
MERIDIONAL COMATIC ABERRATION (mm)

FIG. 20
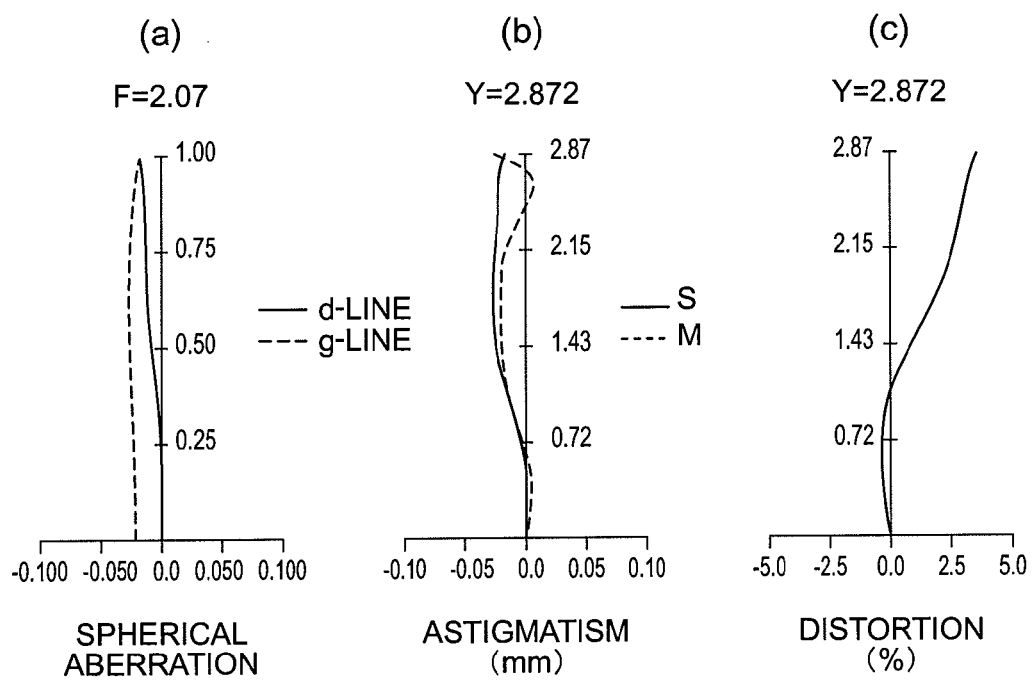
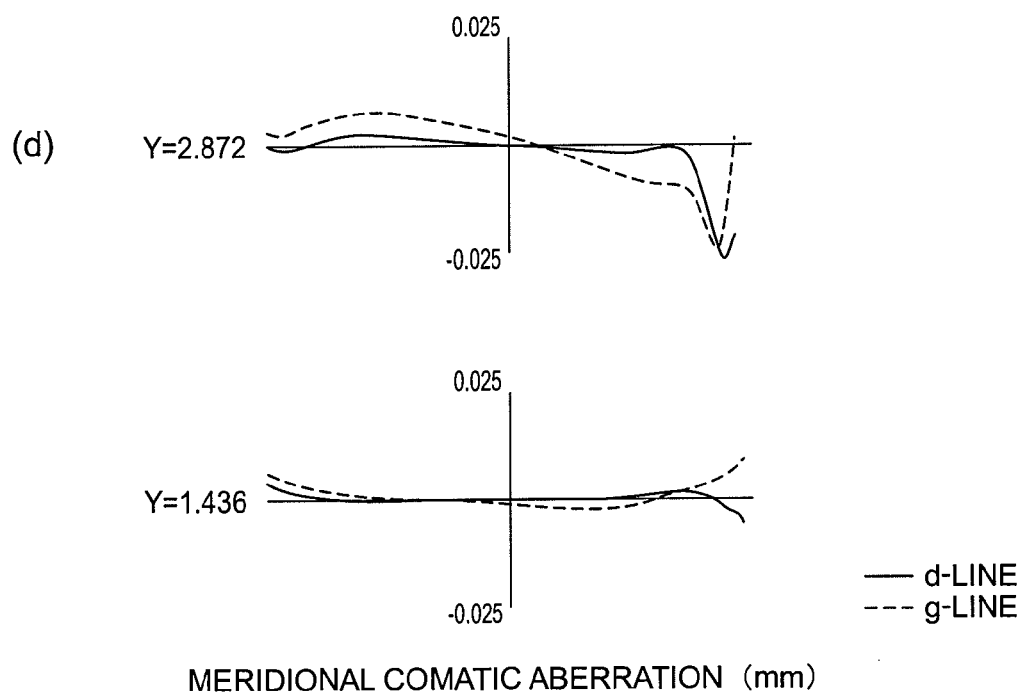
MERIDIONAL COMATIC ABERRATION (mm)

US 9,310,582 B2

IMAGE PICK-UP LENS, IMAGE PICK-UP DEVICE, PORTABLE TERMINAL AND DIGITAL INSTRUMENT

RELATED APPLICATIONS

This application is a U.S. National Phase Application under 35 USC 371 of International Application PCT/JP2012/073063 filed Sep. 10, 2012.

This application claims the priority of Japanese application Nos. 2011-200937 filed Sep. 14, 2011 and 2011-214112 filed Sep. 29, 2011, the entire contents of both of which are hereby incorporated by reference.

TECHNICAL FIELD

The present invention relates to an image pickup lens suitable for a small-sized image pickup apparatus which employs solid state image pickup elements such as CCD type image sensors or CMOS type image sensors, and to an image pickup apparatus and a digital device (digital instrument) such as a portable terminal equipped with the image pickup apparatus.

BACKGROUND ART

Recent years, with an increase in popularization of mobile terminals which incorporate therein an image pickup apparatus using solid state image pickup elements such as CCD (Charge Coupled Device) type image sensors or CMOS (Complementary Metal Oxide Semiconductor) type image sensors, a mobile terminal which incorporate therein an image pickup element with a large number of pixels has been supplied to a commercial market in order to acquire images with higher image quality. Conventionally, an image pickup element with a large number of pixels has been made into a large size. Recent years, the miniaturization of a pixel has progressed more, whereby image pickup elements have been miniaturized. An image pickup lens used for the miniaturized image pickup elements is required to have high image resolution in order to cope with the highly miniaturized pixels. For this request, the image resolution of a lens is limited due to an F-value. Accordingly, since the high image resolution can be obtained from a bright lens with a small F-value, a bright image pickup lens is requested.

On the other hand, also in order to miniaturize an image pickup apparatus more, it is required to make the overall length of an image pickup lens smaller. However, there are limitations in the miniaturization of an image pickup lens based on devisal or idea in terms of a power (refractive power) arrangement, a lens thickness, and an air gap distance. Then, in recent years, the shortening of the overall length of an optical system has been tried by use of a wide angle lens in which the focal length of an image pickup lens is shortened. As an image pickup lens for such a use application, an image pickup lens with a five lens constitution has be proposed because of a possibility to realize high performance as compared with a lens with a three or four lens constitution (for example, refer to Patent Documents 1 to 4).

CITATION LIST

Patent Literature

PTL 1: Japanese Unexamined Patent Publication No. 2011-95513
PTL 2: Japanese Unexamined Patent Publication No. 2011-141396
PTL 3: Japanese Unexamined Patent Publication No. 2010-262270

SUMMARY OF INVENTION

Technical Problem

However, an image pickup lens described in the above Patent Document 1 has a long back focus, which leads to an increase of the overall length of the image pickup lens. Further, an F value is also as dark as about F3, and a maximum field angle is about 70 degrees. Accordingly, this image pickup lens is not a type capable of responding a request to enlarge a diameter and to widen a field angle. Furthermore, if shortening the overall length of a lens, enlarging a diameter, and widening a field angle are performed for the above image pickup lens, the occurrence of deterioration of the performances may be expected, which causes a problem that it may be difficult to cope with a request to increase a density of pixels of an image pickup element.

Further, in an image pickup lens described in the above Patent Document 2, although a technique to enlarge a diameter so as to make an F-value to F2 has been attained, a maximum field angle is as small as about 60 degrees. Accordingly, it may be difficult to say that the overall length of the image pickup lens is sufficiently small-sized. Furthermore, since an aperture stop is arranged between the second lens and the third lens, if the overall length is tried to be shortened more, it becomes difficult to dispose the position of an exit pupil at a position closer to the object side, which results in that the telecentric characteristic deteriorates greatly.

Further, in an image pickup lens described in the above Patent Document 3, since the power of the second lens is made stronger relatively to the power of the third lens, if the overall length is tried to be shortened more, it becomes difficult to correct comatic aberration and astigmatism taking place on the second lens. Furthermore, in an image pickup lens described in the above Patent Document 4, since the power of the third lens in the vicinity of the second lens is made stronger relatively to the focal length of the whole system, a light flux made to diverge at the second lens is made to converge at the third lens. Accordingly, a power proper to each light flux is not provided at a lens after the fourth lens, which results in that it becomes difficult to correct comatic aberration and astigmatic.

The present invention has been achieved in view of the above-mentioned problems, and an object of the present invention is to provide an image pickup lens composed of five lenses, wherein although the image pickup lens is small-sized, various aberrations are corrected favorably, a field angle is wide, and an F value is bright. Further, it becomes possible to provide an image pickup apparatus and a mobile terminal each incorporating the image pickup lens.

As for a dimension of a small-sized image pickup lens, the present invention is aimed to achieve miniaturization at a level to satisfy the following conditional expression (12). Satisfying the range of the conditional expression makes it possible to miniature and to lighten the whole of an image pickup apparatus.

$$L/2Y<0.8 \qquad (12)$$

in the conditional expression, L represents a distance along the optical axis from a lens surface arranged at the extreme object side in the whole system of the image pickup lens to a focal point at the image side, and 2Y represents a diagonal length of an image pickup surface of a solid-state image pickup element (a diagonal length of a rectangular effective pixel area of the solid-state image pickup element).

Here, in the above description, "focal point at the image side" means an image point formed when a parallel light ray parallel to the optical axis enters the image pickup lens.

Here, in the case where a parallel flat plate, such as an optical low-pass filter, an infrared cut-off filter and a sealing glass of a solid-state image pickup element package, is arranged at a position between a lens surface arranged at an extreme image side in the image pickup lens and a focal point at the image side, the value of L is calculated on the assumption that the portion of the parallel flat plate is regarded as an air-equivalent distance. Further, it is more preferable to satisfy a range of the following expression.

$$L/2Y<0.7 \quad (12)'$$

Moreover, in recent years, smart phones and tablet terminals have been spread over rapidly, and a request to miniaturize more an image pickup apparatus mounted on them has been increased. Then, an image pickup apparatus incorporating therein an image pickup lens satisfying the above-mentioned expression (12) is aimed to attain a height of 5.0 mm or less, and more preferably to attain a height of 4.5 mm or less.

Solution to Problem

An image pickup lens described in claim 1 is an image pickup lens to form an image of an object onto a photoelectric conversion section, and includes, in the order from an object side thereof, a first lens which has a positive refractive power and includes a convex surface facing the object side; a second lens which has a negative refractive power; a third lens which includes an aspheric configuration on at least one surface thereof; a fourth lens which has a positive refractive power and includes a convex surface facing an image side; and a fifth lens which has a negative refractive power and includes a biconcave configuration, wherein an image side surface of the fifth lens includes an aspheric configuration and has an inflection point at a position other than an intersection point with an optical axis, and the following conditional expressions are satisfied, $$-5.0<(r1+r2)/(r1-r2)\leq-1.0 \quad (1)$$

$$0.90<f1/f<1.70 \quad (2)$$

$$0.35<\Sigma DL13/f<0.55 \quad (3)$$

in the above expressions, r1 is a radius of curvature of an object side surface of the first lens, r2 is a radius of curvature of an image side surface of the first lens, f1 is a focal length of the first lens, f is a focal length of the whole system of the image pickup lens, and $\Sigma DL13$ is a distance on the optical axis from the object side surface of the first lens to the image side surface of the third lens.

A basic constitution of the present invention configured to obtain an image pickup lens which is a small type and has an aberration corrected favorably, a wide angle, and a bright F value, includes a first lens which has a positive refractive power and includes a convex surface facing the object side; a second lens which has a negative refractive power; a third lens which includes an aspheric configuration on at least one surface thereof; a fourth lens which has a positive refractive power and includes a convex surface facing an image side; and a fifth lens which has a negative refractive power and includes a biconcave configuration. Since the above lens constitution in which a positive lens group composed of the first lens, the second lens, the third lens, and the fourth lens and the fifth lens with a negative refractive power are arranged in the order from the object side, is a so-called telephoto type, the constitution is advantageous in the miniaturization of the overall length of an image pickup lens.

Further, by making each of two or more lenses into a negative lens in the five lens constitution, the number of surfaces having a diverging action is increased so as to facilitate the correction of a Petzval sum, whereby it becomes possible to obtain an image pickup lens which ensures a good image forming function up to a peripheral portion of a screen. Furthermore, by making the fifth lens into a biconcave configuration, the negative refractive power of the fifth lens can be set to be stronger, whereby the overall length shortening effect of the above-mentioned telephoto type can be enhanced more.

Furthermore, by making the image side surface of the fifth lens arranged closest to the image side into an aspheric surface, it becomes possible to correct various aberrations on a peripheral portion of a screen favorably. Moreover, by making the image side surface into an aspheric surface having an inflection point at a position thereon other than an intersection point with the optical axis, it becomes easy to ensure the telecentric characteristic of an image side light flux. Here, the term "an inflection point" means a point on an aspheric surface where a tangential plane on an apex of the aspheric surface becomes a flat surface vertical to an optical axis on a curve shaped in a lens cross sectional configuration within an effective radius.

The conditional expression (1) is a conditional expression to set the configuration of the first lens appropriately so as to attain both a technique to shorten the overall length of an image pickup lens and a technique to suppress comatic aberration taking place on the first lens. In more concrete terms, the conditional expression (1) defines the so-called shaping factor representing the configuration of the first lens, and the first lens is set within a range from a plane-convex lens to a meniscus configuration having a convex surface facing the object side within a range of the conditional expression. With the value of the conditional expression (1) lower than the upper limit, since the first lens becomes a meniscus configuration, it becomes possible to move the principal point position of the whole system of the image pickup lens toward the object side, whereby the overall length of the image pickup lens can be shortened. Here, the value of the conditional expression (1) may be equal to the upper limit. On the other hand, with the value of the conditional expression (1) higher than the lower limit, the curvature radius of an object side surface of the first lens does not become too small, whereby it becomes possible to suppress comatic aberration for peripheral light rays provided with a large field angle to be smaller.

Further, with the value of the conditional expression (2) higher than the lower limit, the focal length of the first lens does not become too short so that the first lens has a constitution near a retro focus type, whereby an incidence field angle can be secured easily and the field angle of an image pickup lens can be made wider. Furthermore, since occurrence of spherical aberration can be suppressed, an aperture size (diameter) can be made larger. On the other hand, with the value of the conditional expression (2) lower than the upper limit, it becomes possible to suppress the focal length of the first lens from becoming too long and the principal point position of the image pickup lens can be arranged at the object side, whereby the miniaturization of the image pickup lens becomes easy.

Further, with the value of the conditional expression (3) higher than the lower limit, a distance on the optical axis from the first lens to the third lens can be made long moderately.

Accordingly, a clearance for inserting a light shielding member in each space between neighboring lenses can be taken sufficiently, whereby unnecessary light rays, such as ghost rays and flare light rays, can be reduced, which leads to an improvement in image quality. Furthermore, since each lens does not become too thin, the moldability is not likely to be spoiled. On the other hand, with the value of the conditional expression (3) lower than the upper limit, since the second negative lens being important for chromatic aberration correction can be arranged at an object side where a light ray height is higher, it become possible to correct the chromatic aberration of the whole system favorably.

Moreover, it is preferable that the conditional expressions (1), (2), and (3) are within the following respective ranges.

$$-4.5 < (r1+r2)/(r1-r2) \le -1.5 \quad (1)'$$

$$1.00 < f1/f < 1.60 \quad (2)'$$

$$0.40 < \Sigma DL13/f < 0.55 \quad (3)'$$

An image pickup lens described in claim 2 is an image pickup lens to form an image of an object onto a photoelectric conversion section, and includes, in the order from an object side thereof, a first lens which has a positive refractive power and includes a convex surface facing the object side; a second lens which has a negative refractive power; a third lens which has a positive refractive power; a fourth lens which has a positive refractive power and includes a convex surface facing an image side; and a fifth lens which has a negative refractive power and includes a concave surface facing an image side, wherein an image side surface of the fifth lens includes an aspheric configuration and has an inflection point at a position other than an intersection point with an optical axis, and the following conditional expression is satisfied.

$$0.05 < |P2|/P < 0.55 \quad (4)$$

in the above expression, P2 is a refractive power of the second lens, and P is a refractive power of the whole system of the image pickup lens.

Here, in this application, a refractive power means the inverse number of a focal length.

A basic constitution of the present invention configured to obtain an image pickup lens which is a small type and has an aberration corrected favorably, a wide angle, and a bright F value, includes a first lens which has a positive refractive power and includes a convex surface facing the object side; a second lens which has a negative refractive power; a third lens which has a positive refractive power; a fourth lens which has a positive refractive power and includes a convex surface facing an image side; and a fifth lens which has a negative refractive power and includes a concave surface facing an image side. Since the above lens constitution in which a positive lens group composed of the first lens, the second lens, the third lens, and the fourth lens and the fifth lens with a negative refractive power are arranged in the order from an object side, is a so-called telephoto type, the constitution is advantageous in the miniaturization of the overall length of an image pickup lens.

Further, by making each of two lenses into a negative lens in the five lens constitution, the number of surfaces having a diverging action is increased so as to facilitate the correction of a Petzval sum, whereby it becomes possible to obtain an image pickup lens which ensures a good image forming function up to a peripheral portion of an image screen. Furthermore, by making the third lens into a positive lens, a lens group from the first lens to the third lens is made into a so-called triplet type in which the lens group is arranged in the order of positive, negative, and positive, whereby the aberration correction in a front lens system can be performed favorably.

Furthermore, by making the image side surface of the fifth lens arranged closest to the image side into an aspheric surface, it becomes possible to correct various aberrations on a peripheral portion of an image screen favorably. Moreover, by making the image side surface into an aspheric surface having an inflection point at a position thereon other than an intersection point with the optical axis, it becomes easy to ensure the telecentric characteristic of an image side light flux. Here, the term "an inflection point" means a point on an aspheric surface where a tangential plane on an apex of the aspheric surface becomes a flat surface vertical to an optical axis on a curve shaped in a lens cross sectional configuration within an effective radius.

The conditional expression (4) is a conditional expression to set the refractive power of the second lens appropriately so as to attain a technique to widen a field angle and a technique to increase a performance. With the value of the conditional expression (2) lower than the upper limit, it becomes possible to prevent the negative refractive power of the second lens from becoming too strong such that the principal point position of an image pickup lens is not arranged at an image side, whereby a good telecentric characteristic can be obtained. Further, occurrence of spherical aberration and comatic aberration can be suppressed, which makes it possible to attain a technique to make a performance higher. On the other hand, with the value of the conditional expression (4) higher than the lower limit, the negative refractive power of the second lens can be maintained moderately, whereby in the whole image pickup lens, the negative refractive power can be arranged comparatively at the object side, which make it possible to attain a technique to make a field angle wider. Moreover, it is preferable that the conditional expression (4) is within the following range.

$$0.05 < |P2|/P < 0.50 \quad (4)'$$

The image pickup lens described in claim 3, in the invention described in claim 1 or 2, is characterized in that the following conditional expression is satisfied.

$$0.35 < f4/f < 1.00 \quad (5)$$

in the above expression, f4 is a focal length of the fourth lens, and f is a focal length of the whole system of the image pickup lens.

The conditional expression (5) is a conditional expression to set the focal length of the fourth lens appropriately. With the value of the conditional expression (5) higher than the lower limit, the focal length of the fourth lens does not become too small, whereby occurrence of each of high order spherical aberration and comatic aberration can be suppressed. On the other hand, with the value of the conditional expression (5) lower than the upper limit, the focal length of the fourth lens can be maintained moderately, whereby it becomes possible to attain a technique to shorten the overall length of an image pickup lens. Moreover, it is preferable that the conditional expression (5) is within the following range.

$$0.40 < f4/f < 0.90 \quad (5)'$$

The image pickup lens described in claim 4, in the invention described in any one of claims 1 to 3, is characterized in that the following conditional expression is satisfied.

$$-0.70 < f5/f < -0.25 \quad (6)$$

in the above expression, f5 is a focal length of the fifth lens, and f is a focal length of the whole system of the image pickup lens.

The conditional expression (6) is a conditional expression to set the focal length of the fifth lens appropriately. With the value of the conditional expression (6) lower than the upper limit, the negative focal length of the fifth lens does not become too small more than needed, a light flux forming an image on a peripheral portion of an image pickup surface of a solid state image pickup element is not likely to be made flip-up excessively, whereby the telecentric characteristic of an image side light flux can be secured easily. On the other hand, with the value of the conditional expression (6) higher than the lower limit, the negative focal length of the fifth lens can be made longer moderately, whereby the overall length of a lens can be shortened and various off-axis aberrations, such as image surface curvature, distortion aberration, and the like can be corrected favorably. Moreover, it is preferable that the conditional expression (6) is within the following range.

$$-0.65 < f5/f < -0.30 \quad (6)'$$

The image pickup lens described in claim 5, in the invention described in any one of claims 1 to 4, is characterized in that the following conditional expression is satisfied.

$$20 < v1-v2 < 70 \quad (7)$$

in the above expression, v1 is an Abbe number of the first lens, and v2 is an Abbe number of the second lens.

The conditional expression (7) is a conditional expression to correct chromatic aberration of the whole system of the image pickup lens favorably. With the value of the conditional expression (7) higher than the lower limit, chromatic aberrations such as axial chromatic aberration and magnification chromatic aberration can be corrected favorably with proper balance. On the other hand, with the value of the conditional expression (7) lower than the upper limit, the lenses can be constituted with easily-obtainable glass materials. Moreover, it is preferable that the conditional expression (7) is within the following range.

$$25 < v1-v2 < 65 \quad (7)'$$

The image pickup lens described in claim 6, in the invention described in any one of claims 1 to 5, is characterized in that the following conditional expression is satisfied.

$$1.60 < n2 < 2.10 \quad (8)$$

in the above expression, n2 is a refractive index of the second lens for d-line.

The conditional expression (8) is a conditional expression to correct the chromatic aberration and image surface curvature of the whole system of the image pickup lens favorably. With the value of the conditional expression (8) higher than the lower limit, the refractive power of the second lens with comparatively large dispersion can be maintained moderately, whereby the chromatic aberration and the image surface curvature can be corrected favorably. On the other hand, with the value of the conditional expression (8) lower than the upper limit, the lenses can be constituted with easily-obtainable glass materials. Moreover, it is preferable that the conditional expression (8) is within the following range.

$$1.60 < n2 < 2.00 \quad (8)'$$

The image pickup lens described in claim 7, in the invention described in any one of claims 1 to 6, is characterized in that the following conditional expression is satisfied.

$$0.02 < dL2/f < 0.11 \quad (9)$$

in the above expression, dL2 is a thickness of the second lens on the optical axis, and f is a focal length of the whole system of the image pickup lens.

The conditional expression (9) is a conditional expression to set a thickness of the second lens on the optical axis appropriately. With the value of the conditional expression (9) higher than the lower limit, since the thickness of the second lens does not become too thin, the moldability is not spoiled. On the other hand, with the value of the conditional expression (9) lower than the upper limit, the thickness of the second lens does not become too thick so that it becomes easy to secure a lens interval before and after L2. As a result, the overall length of the image pickup lens can be shortened. Moreover, it is preferable that the conditional expression (9) is within the following range.

$$0.03 < dL2/f < 0.10 \quad (9)'$$

The image pickup lens described in claim 8, in the invention described in any one of claims 1 to 7, is characterized in that the following conditional expression is satisfied.

$$0.04 < dL5/f < 0.20 \quad (10)$$

in the above expression, dL5 is a thickness of the fifth lens on the optical axis, and f is a focal length of the whole system of the image pickup lens.

The conditional expression (10) is a conditional expression to set a thickness of the fifth lens on the optical axis appropriately. With the value of the conditional expression (10) higher than the lower limit, since the thickness of the fifth lens does not become too thin, the moldability is not spoiled. On the other hand, with the value of the conditional expression (10) lower than the upper limit, the thickness of the fifth lens does not become too thick so that it becomes easy to secure a back focus. Moreover, it is preferable that the conditional expression (10) is within the following range.

$$0.06 < dL5/f < 0.17 \quad (10)'$$

The image pickup lens described in claim 9, in the invention described in any one of claims 1 to 8, is characterized in that the following conditional expression is satisfied.

$$2.50 < THL5m/dL5 < 6.50 \quad (11)$$

in the above expression, THL5m is a maximum thickness of the fifth lens in the optical axis direction and dL5 is a thickness of the fifth lens on the optical axis.

The conditional expression (11) is a conditional expression to set a ratio of a maximum thickness of the fifth lens in the optical axis direction to a thickness of the fifth lens on the optical axis, i.e., a so-called uneven thickness ratio appropriately. With the value of the conditional expression (11) higher than the lower limit, an uneven thickness ratio can be provided moderately so that a difference in refractive power between a portion in the vicinity of the center of the fifth lens and a peripheral portion can be provided moderately. Accordingly, a telecentric characteristic can be made favorably, and it becomes possible to attain both correction for chromatic aberration in the vicinity of the center and correction for image surface curvature on the peripheral portion. On the other hand, with the value of the conditional expression (11) lower than the upper limit, since the uneven thickness ratio does not become too large, the moldability of the lens is not spoiled. Moreover, it is preferable that the conditional expression (11) is within the following range.

$$2.80 < THL5m/dL5 < 6.00 \quad (11)'$$

The image pickup lens described in claim 10, in the invention described in claim 1, is characterized in that the third lens has a positive refractive power.

By making the third lens have a positive refractive power, a so-called triplet type lens constitution is formed by the first lens with a positive refractive power, the second lens with a negative refractive power, and the third lens with a positive refractive power. Accordingly, aberration correction can be performed favorably through the first lens to the third lens.

The image pickup lens described in claim 11, in the invention described in any one of claims 1 to 10, is characterized in that an extreme peripheral portion of the fourth lens has a diverging action to flip light rays upward.

By making an extreme peripheral portion of the fourth lens have the diverging action, the fourth lens can share the diverging action for peripheral light fluxes with the second lens while having a positive refractive power on a portion in the vicinity of the center thereof so as to make its constitution suitable for making the field angle of the image pickup lens wider. Accordingly, it become possible to obtain an image pickup lens with a wider field angle while performing correction for comatic aberration, distortion aberration, magnification chromatic aberration, and the like for peripheral light fluxes.

The image pickup lens described in claim 12, in the invention described in any one of claims 1 to 11, is characterized in that an aperture stop is arranged at an extreme object side in an image pickup lens group.

By arranging an aperture stop at an extreme object side, since a refraction angle on the object side surface of the first lens can be made small, it becomes possible to suppress high order spherical aberration and comatic aberration from occurring on the first lens. Further, since the height of light rays passing through the first lens can be made small, it becomes easy to secure the marginal thickness of the first lens, whereby the moldability can be improved. In particular, this feature is a very important requirement in an optical system with a large aperture size (diameter).

The image pickup lens described in claim 13, in the invention described in any one of claims 1 to 11, is characterized in that an aperture stop is arranged between the first lens and the second lens.

By arranging an aperture stop between the first lens and the second lens, the refraction angle of peripheral marginal light rays passing through the object side surface of the first lens does not become too large, whereby it becomes possible to attain both the miniaturization of the image pickup lens and good aberration correction.

The image pickup lens described in claim 14, in the invention described in any one of claims 1 to 13, is characterized in that the image pickup lens includes a lens which does not have refractive power substantially. That is, even in the case where the image pickup lens with the constitution described in claim 1 includes a dummy lens which does not have refractive power substantially, such a case is within an applicable range of the present invention.

An image pickup apparatus described in claim 15 is characterized in including a solid state image pickup element to perform photoelectric conversion for an image of an object and the image pickup lens described in any one of claims 1 to 14. By using the image pickup lens of the present invention, a smaller and highly efficient image pickup apparatus can be obtained.

A mobile terminal described in claim 16 is characterized in including the image pickup apparatus described in claim 15. By using the image pickup apparatus of the present invention, a smaller and highly efficient mobile terminal can be obtained.

An image pickup lens described in claim 17 is an image pickup lens to form an image of an object onto an image pickup surface (for example, a photoelectric conversion section of a solid state image pickup element) of an image pickup element, and includes, in the order from an object side thereof, a first lens which has a positive refractive power and includes a convex surface facing the object side; a second lens which has a negative refractive power; a third lens which has a positive refractive power; a fourth lens which has a positive refractive power and includes a convex surface facing an image side; and a fifth lens which has a negative refractive power and includes a biconcave configuration, wherein an image-side surface of the fifth lens includes an aspheric configuration and has an inflection point at a position other than an intersection point with an optical axis, and the following conditional expressions (13) and (14) are satisfied.

$$1.8 < f3/f < 10.0 \tag{13}$$

$$-5.0 < f2/f3 < -0.70 \tag{14}$$

in the above expressions, f is a focal length of the whole system of the image pickup lens, f2 is a focal length of the second lens, and f3 is a focal length of the third lens.

A basic constitution of the present invention configured to obtain an image pickup lens which is a small type and has aberration corrected favorably, a wide angle, and a bright F value, includes a first lens which has a positive refractive power and includes a convex surface facing the object side; a second lens which has a negative refractive power; a third lens which has a positive refractive power; a fourth lens which has a positive refractive power and includes a convex surface facing an image side; and a fifth lens which has a negative refractive power and includes a biconcave configuration. In the above lens constitution, a positive lens group composed of the first lens, the second lens, the third lens, and the fourth lens and the fifth lens with a negative refractive power are disposed in the order from an object side in a so-called telephoto type arrangement (power is an amount defined by a reverse number of a focal length). Accordingly, the above lens constitution is advantageous in the miniaturization of the overall length of the image pickup lens. Further, by making each of two or more lenses into a negative lens in the five lens constitution, the number of surfaces having a diverging action is increased so as to facilitate the correction of a Petzval sum, whereby it becomes possible to obtain an image pickup lens which ensures the good image forming function up to a peripheral portion of an image screen. Furthermore, by making the fifth lens into a biconcave configuration, the negative refractive power of the fifth lens can be set strong, whereby the overall length shortening effect of the above-mentioned telephoto type can be enhanced more.

By making the fourth lens into a meniscus configuration with a convex surface facing the image side, it becomes easy to correct comatic aberration taking place on the second lens with a negative power. Furthermore, by making the image side surface of the fifth lens arranged at the extreme image side into an aspheric surface, it becomes possible to correct various aberrations on a peripheral portion of an image screen favorably. Moreover, by making the image side surface into an aspheric surface having an inflection point at a position thereon other than an intersection point with the optical axis, it becomes easy to ensure the telecentric characteristic of an image side light flux. Here, the term "an inflection point" means a point on an aspheric surface where a tangential plane on an apex of the aspheric surface becomes a flat surface vertical to an optical axis on a curve with a lens cross sectional configuration within an effective radius.

The conditional expression (13) is configured to attain both the shortening of an overall length and a performance at a high image height by specifying the focal length of the third lens in a proper range. With the value of the conditional expression (13) lower than the upper limit, the positive power of the third lens can be maintained moderately, whereby an image surface curvature can be corrected favorably. With the value of the conditional expression (13) higher than the lower limit, the positive power of the third lens does not become too strong, whereby comatic aberration and astigmatism can be corrected favorably.

The conditional expression (14) specifies the relationship between the focal length of the second lens and the focal length of the third lens. With the value of the conditional expression (14) higher than the lower limit, the power of the second lens can be maintained moderately for the power of the third lens, whereby the correction of a Petzval sum can be performed favorably and an image surface curvature can be corrected favorably. With the value of the conditional expression (14) lower than the upper limit, the power of the second lens does not become too strong relatively to the power of the third lens, whereby comatic aberration and astigmatism can be corrected favorably. Further, since the principal point position of the image pickup lens is arranged at the object side, good telecentric characteristic can be obtained.

According to this constitution, it becomes possible to realize an image pickup lens which is composed of five lenses and has a shortened overall length, various favorably-corrected aberrations, a wide field angle, and a bright F value, and to realize an image pickup apparatus equipped the above image pickup lens. Further, by using the image pickup apparatus for digital devices, such as a mobile telephone and a mobile information terminal, it becomes possible to provide the digital devices with an image input function of a high performance in a compact size, whereby it becomes possible to contribute to make a size to be more compact, a performance to be higher, and a function to be higher. Hereafter, description will be given to conditions to attain a higher optical performance and a miniaturization while obtaining the above effects with a proper balance.

It is preferable to satisfy the following conditional expression (13a), and it is more preferable to satisfy the conditional expression (13b).

$$2.0<f3/f<7.0 \tag{13a}$$

$$2.0<f3/f<5.0 \tag{13b}$$

The above conditional expressions (13a) and (13b) specify the more preferable conditional ranges based on the above-mentioned viewpoints among the conditional range specified in the conditional expression (13). Therefore, by satisfying preferably the conditional expression (13a), and by satisfying more preferably the conditional expression (13b), the above effects can be made larger.

It is preferable to satisfy the following conditional expression (14a), and it is more preferable to satisfy the conditional expression (14b).

$$-3.5<f2/f3<-0.75 \tag{14a}$$

$$-3.5<f2/f3<-0.8 \tag{14a}$$

The above conditional expressions (14a) and (14b) specify the more preferable conditional ranges based on the above-mentioned viewpoints among the conditional range specified in the conditional expression (14). Therefore, by satisfying preferably the conditional expression (14a), and by satisfying more preferably the conditional expression (14b), the above effects can be made larger.

The image pickup lens described in claim 18, in the invention described in claim 17, is characterized in that the following conditional expression (15) is satisfied.

$$1.2<f1/f4<4.0 \tag{15}$$

in the above expression, f1 is a focal length of the first lens, and f4 is a focal length of the fourth lens.

In the case where the overall length of an optical system is shortened, a difference in optical path length between on the optical axis and on a position at a peripheral field angle becomes large, which causes a problem of an image surface curvature. The conditional expression (15) is configured to correct an image surface curvature in a proper range by specifying a ratio of the focal length of the first lens and the focal length of the fourth lens. With the value of the conditional expression (15) lower than the higher limit, an image surface curvature at an over side can be corrected favorably, and with the value of the conditional expression (15) higher than the lower limit, an image surface curvature at an under side can be corrected favorably, It is more preferable to satisfy the following conditional expression (15a).

$$1.2<f1/f4<3.5 \tag{15a}$$

The above conditional expression (15a) specifies the more preferable conditional range based on the above-mentioned viewpoints among the conditional range specified in the conditional expression (15). Therefore, by satisfying preferably the conditional expression (15a), the above effects can be made larger.

The image pickup lens described in claim 19, in the invention described in claim 17 or 18, is characterized in that the following conditional expression (16) is satisfied.

$$0.15<D2\_3/D3\_4<0.85 \tag{16}$$

in the above expression, D2_3 is a distance of an air space on the optical axis between the second lens and the third lens and D3_4 is a distance of an air space on the optical axis between the third lens and the fourth lens.

The conditional expression (16) is configured to make the third lens exert a positive power for each of light fluxes different in field angle in response to the respective field angles so as to correct an image surface curvature favorably by specifying a distance from the image side surface of the second lens to the object side surface of the third lens and a distance from the image side surface of the third lens to the object side surface of the fourth lens. With the value of the conditional expression (16) higher than the lower limit, the distance between the second lens and the third lens does not become too small, whereby an image surface curvature can be corrected favorably. With the value of the conditional expression (16) lower than the upper limit, the distance between the second lens and the third lens does not become too large, whereby comatic aberration can be corrected favorably.

It is preferable to satisfy the following conditional expression (16a), and it is more preferable to satisfy the conditional expression (16b).

$$0.18<D2\_3/D3\_4<0.80 \tag{16a}$$

$$0.20<D2\_3/D3\_4<0.75 \tag{16b}$$

The above conditional expressions (16a) and (16b) specify the more preferable conditional ranges based on the above-mentioned viewpoints among the conditional range specified in the conditional expression (16). Therefore, by satisfying preferably the conditional expression (16a), and by satisfying more preferably the conditional expression (16b), the above effects can be made larger.

The image pickup lens described in claim 20, in the invention described in any one of claims 17 to 19, is characterized in that the following conditional expression (17) is satisfied.

$$-25<f2/f4<-3 \tag{17}$$

in the above expression, f2 is a focal length of the second lens, and f4 is a focal length of the fourth lens.

The conditional expression (17) is configured to set the power of each of the second lens and the fourth lens. With the value of the conditional expression (17) higher than the lower limit, the power of the second lens can be maintained moderately, whereby the second lens can make a light flux diverge sufficiently. Accordingly, the fourth lens can exert powers separately for light fluxes in response to the respective field angles of the light fluxes, whereby an image surface curvature can be corrected favorably. With the value of the conditional expression (17) lower than the upper limit, the power of the second lens does not become too strong, whereby the comatic aberration taking place on the second lens can be corrected favorably.

It is more preferable to satisfy the following conditional expression (17a).

$$-20 < f2/f4 < -3 \quad (17a)$$

The above conditional expression (17a) specifies the more preferable conditional range based on the above-mentioned viewpoints among the conditional range specified in the conditional expression (17). Therefore, by satisfying preferably the conditional expression (17a), the above effects can be made larger.

The image pickup lens described in claim 21, in the invention described in any one of claims 17 to 20, is characterized in that an image side surface of the first lens has a negative power. By making an image side surface of the first lens have a negative power, the image side surface of the first lens is enabled to have a diverging action, whereby it becomes possible to realize a lens in which comatic aberration is made little while its overall length is shortened.

The image pickup lens described in claim 22, in the invention described in any one of claims 17 to 21, is characterized in that the following conditional expression (18) is satisfied.

$$20 < v1 - v2 < 70 \quad (18)$$

in the above expression, v1 is an Abbe number of the first lens, and v2 is an Abbe number of the second lens.

The conditional expression (18) is configured to specify a conditional range preferable in correcting the chromatic aberration of the whole system of the image pickup lens favorably. With the value of the conditional expression (18) higher than the lower limit, chromatic aberrations such as axial chromatic aberration and magnification chromatic aberration can be corrected favorably with proper balance. On the other hand, with the value of the conditional expression (18) lower than the upper limit, the lenses can be constituted with easily-obtainable glass materials.

It is more preferable to satisfy the following conditional expression (18a).

$$25 < v1 - v2 < 65 \quad (18a)$$

The above conditional expression (18a) specifies the more preferable conditional range based on the above-mentioned viewpoints among the conditional range specified in the conditional expression (18). Therefore, by satisfying preferably the conditional expression (18a), the above effects can be made larger.

The image pickup lens in an embodidment is characterized in that the following conditional expression is satisfied.

$$1.60 < n2 < 2.10 \quad (19)$$

in the above expression, n2 is a refractive index of the second lene for d-line.

The conditional expression (19) is configured to specify a conditional range preferable in correcting the chromatic aberration and image surface curvature of the whole system of the image pickup lens favorably. With the value of the conditional expression (19) higher than the lower limit, the refractive power of the second lens with comparatively large dispersion can be maintained moderately, whereby chromatic aberration and image surface curvature can be corrected favorably. On the other hand, with the value of the conditional expression (19) lower than the upper limit, the lenses can be constituted with easily-obtainable glass materials.

It is more preferable to satisfy the following conditional expression (19a).

$$1.60 < n2 < 2.00 \quad (19a)$$

The above conditional expression (19a) specifies the more preferable conditional range based on the above-mentioned viewpoints among the conditional range specified in the conditional expression (19). Therefore, by satisfying preferably the conditional expression (19a), the above effects can be made larger.

The image pickup lens in an embodiment is characterized in that an extreme peripheral portion of the fourth lens has a diverging action to flip light rays upward. By making an extreme peripheral portion of the fourth lens have the diverging action, the fourth lens can share the diverging action for peripheral light fluxes with the second lens while having a positive refractive power on a portion in the vicinity of the center thereof so as to make its constitution suitable for making the field angle of the image pickup lens wider. Accordingly, it becomes possible to realize an image pickup lens with a wider field angle while performing correction for comatic aberration, distortion aberration, magnification chromatic aberration, and the like for peripheral light fluxes.

The image pickup lens in an embodiment is characterized in that the negative power of a portion of an image side surface of the second lens becomes stronger as the portion moves from an intersection point with the optical axis to a peripheral portion. By making the configuration of the image side surface of the second lens into such a configuration that as a portion of the image side surface is moving to a peripheral portion, the negative power of the portion becomes stronger, it becomes possible to realize an image pickup lens in which an image surface curvature due to a difference in optical path between an on-axis field angle and a peripheral field angle in association with the shortening of an overall length is corrected favorably.

It is preferable that an aperture stop is positioned closest to the object side in an image pickup lens. By arranging the aperture stop closest to the object side in an image pickup lens system, a distance between an incidence pupil and an image pickup surface does not become too short, whereby it becomes possible to realize a favorable telecentric characteristic.

It is preferable that all lenses are made of plastic material. That is, it is preferable that an image pickup lens includes only a plastic lens as a lens. In recent years, under the purpose of downsizing the whole of an image pickup optical apparatus including a solid-state image pickup element, the solid-state image pickup element has been developed so as to have a small pixel pitch even though the number of pixels is the same. As a result, the solid-state image pickup element has a small-sized image pickup surface. In an image pickup lens for such a solid-state image pickup element having a small-sized image pickup surface, since a focal length of the whole optical system is requested to be relatively short, the curvature radius and outside diameter of each lens is made considerably small. Therefore, as compared with a glass lens manufactured through a time-consuming grinding process, in the case where all lenses are constituted by a plastic lens manufactured through an injection molding process, even if each of lenses has a small curvature radius and a small outside diameter, the all lenses can be mass-produced at low cost. In addition, in the case of a plastic lens, since a press temperature can be set to be low, it is possible to suppress wear and tear of a molding die. As a result, a frequency of replacement of molding dies and a frequency of maintenance can be reduced, which realizes cost reduction.

An image pickup apparatus in an embodiment is characterized by including an image pickup lens described above and an image pickup element to convert an optical image formed on an image pickup surface into electric signals, wherein the image pickup lens is disposed such that an optical image of an object is formed on an image pickup surface of the image pickup element.

A digital device in an embodiment is characterized by including the image pickup apparatus whereby at least one function of static image photography and video photography for a photographic object is added.

The digital device in an embodiment is characterized in that the digital device is a mobile terminal.

Herein, each of the above-mentioned conditional expressions has the above-mentioned respective effects independently.

The image pickup lens in relation to the present invention is suitable for use as an image pickup lens used for digital devices (for example, mobile terminals) equipped with an image input function. By combining this image pickup lens with image pickup elements and the like, it becomes possible to constitute an image pickup apparatus configured to take in optically a picture of a photographic object and to output it as electric signals. The image pickup apparatus is an optical apparatus which constitutes a main constitutional element of a camera used for still image photography and video photography of a photographic object. For example, the image pickup apparatus is constituted by including, in the order from an object (i.e., a photographic object), an image pickup lens which forms an optical image of the object and an image pickup element which converts the optical image formed by the image pickup lens into electric signals. Then, by arranging the image pickup lens having the above-mentioned characteristic constitutions such that an optical image of the object is formed on an image receiving surface (i.e., an image pickup surface) of the image pickup element, it becomes possible to realize an image pickup apparatus with a small size, a low cost, and a high performance, and to realize a digital device equipped with the image pickup apparatus.

Examples of the digital device equipped with an image input function, include cameras, such as a digital camera, a video camera, a surveillance camera, an in-vehicle camera, and a camera for visual telephone; and further include cameras incorporated in or attached to a personal computer, a mobile terminal (for example, small portable information device terminals, such a mobile telephone, and a mobile computer), their peripheral devices (a scanner, a printer, etc.), and the other digital devices. As can be understood from these examples, it becomes possible not only to constitute a cameral by using the image pickup apparatus, but also to add a camera function by installing the image pickup apparatus into various devices. For example, it becomes possible to constitute digital devices equipped with an image input function such as a mobile telephone equipped with a camera.

Advantageous Effects of Invention

According to the present invention, it becomes possible to provide an image pickup lens composed of five lenses, wherein although the image pickup lens is a small size, various aberrations are corrected favorably, a field angle is wide, and F value is bright. Further, it becomes possible to provide an image pickup apparatus and a mobile terminal each incorporating the image pickup lens.

Further, by using the image pickup apparatus in relation to the present invention in digital devices such as a mobile telephone and a mobile information terminal, it becomes possible to add an image input function of a high performance in a compact size into the digital devices.

BRIEF DESCRIPTION OF DRAWINGS

FIG. 6 shows aberration diagrams (spherical aberration (a), astigmatism (b), distortion (c), and meridional comatic aberration (d)) of Example 1.

FIG. 8 shows aberration diagrams (spherical aberration (a), astigmatism (b), distortion (c), and meridional comatic aberration (d)) of Example 2.

FIG. 10 shows aberration diagrams (spherical aberration (a), astigmatism (b), distortion (c), and meridional comatic aberration (d)) of Example 3.

FIG. 12 shows aberration diagrams (spherical aberration (a), astigmatism (b), distortion (c), and meridional comatic aberration (d)) of Example 4.

FIG. 14 shows aberration diagrams (spherical aberration (a), astigmatism (b), distortion (c), and meridional comatic aberration (d)) of Example 5.

FIG. 16 shows aberration diagrams (spherical aberration (a), astigmatism (b), distortion (c), and meridional comatic aberration (d)) of Example 6.

FIG. 18 shows aberration diagrams (spherical aberration (a), astigmatism (b), distortion (c), and meridional comatic aberration (d)) of Example 7.

FIG. 20 shows aberration diagrams (spherical aberration (a), astigmatism (b), distortion (c), and meridional comatic aberration (d)) of Example 8.

DESCRIPTION OF EMBODIMENTS

Hereafter, the embodiments of the present invention will be described with reference to drawings.

Figure 1:
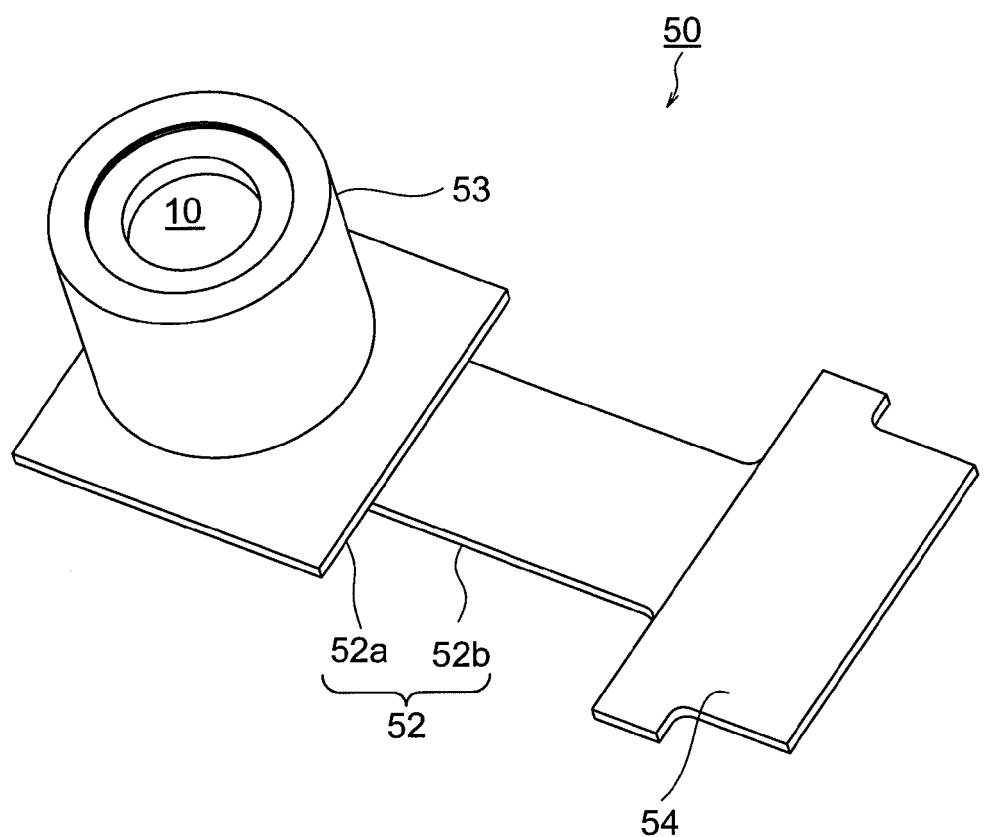
FIG. 1 is a perspective view of an image pickup unit 50 in relation to the present embodiment.
Figure 2:
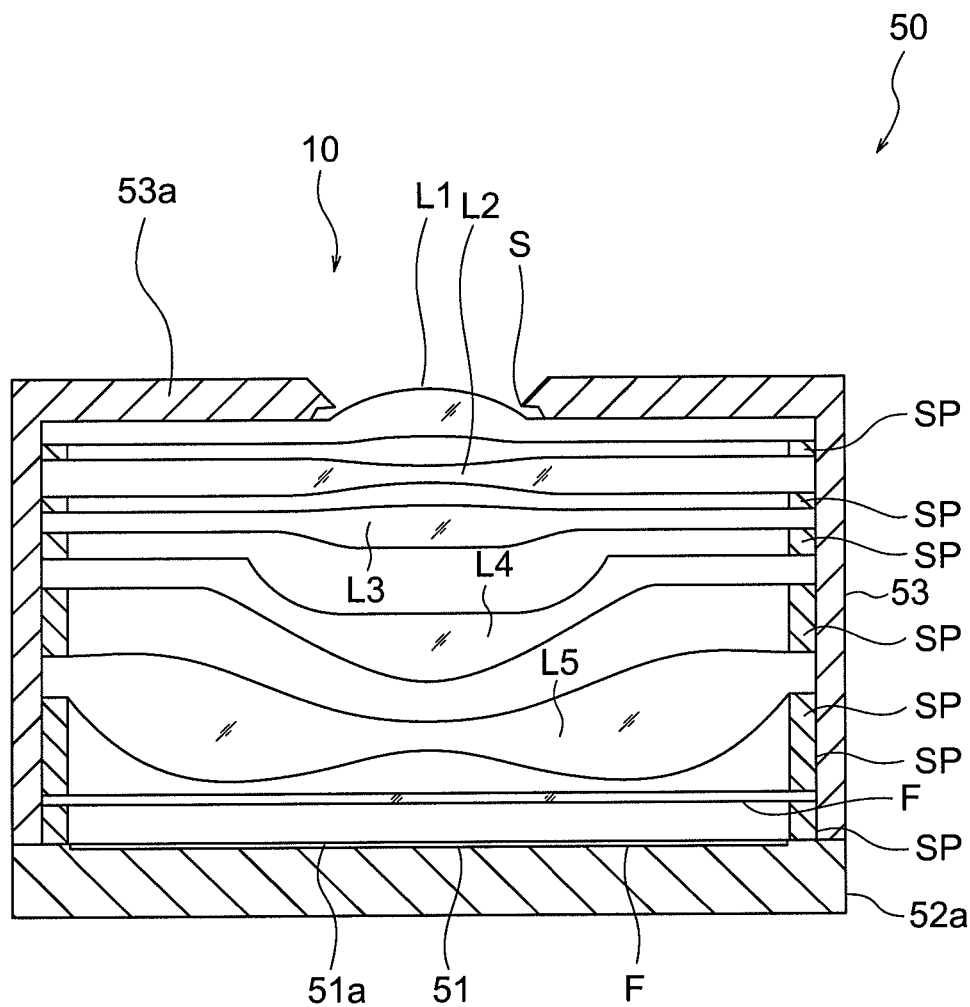
FIG. 2 is an illustration showing schematically a cross section along an optical axis of an image pickup optical system of the image pickup unit 50.

FIG. 1 is a perspective view of an image pickup unit 50, and FIG. 2 is an illustration showing schematically a cross section along an optical axis of an image pickup optical system of the image pickup unit 50.

As shown in FIG. 1 and FIG. 2, the image pickup unit 50 being an image pickup apparatus includes a CMOS type image pickup element 51 serving as a solid state image pickup element including a photoelectric conversion section 51a, an image pickup lens 10 which makes the photoelectric conversion section 51a of the image pickup element 51 photograph an image of a photographic object, a base plate 52 which holds the image pickup element 51 and is connected to a terminal for external connection (it is also called an external connection terminal) 54 configured to transmit and receive the electric signals of the photoelectric conversion section 51a, and a housing 53 which includes an opening portion to allow light to enter from an object side and serves as a lens barrel composed of light shielding members. The above components are formed integrally into a single body.

As shown in FIG. 2, in the image pickup element 51, pixels (photoelectric converting elements) are arranged in two dimensions on the central portion of a flat surface at a light receiving side of the image pickup element 51 so as to form a photoelectric conversion section 51a serving as a light receiving member, and a signal processing circuit (not-shown) is formed in the periphery of the image pickup element 51. The signal processing circuit includes a drive circuit section configured to drive respective pixels sequentially and obtains signal charges from them, an A/D conversion section configured to convert each signal charge into a digital signal, and a signal processing sections configured to form an image signal output by using the digital signals. Further, in the vicinity of outer edges of the flat surface at the light receiving side of the image pickup element 51, a number of pads (illustration is omitted) are arranged, and are connected to the base plate 52 via wires (not-shown). The image pickup element 51 is configured to convert signal charges from the photoelectric conversion section 51a into image signals, such as digital YUV signals, and outputs the image signals to a prescribed circuit on the base plate 52 via the wires. Here, a Y signal is a luminance signal, a U(=R−Y) signal is a color difference signal between red and a luminance signal, and a V(=B−Y) is a color difference signal between blue and a luminance signal. Further, the image pickup element should not be limited to the above-mentioned CMOS type image sensor, and other image pickup elements, such as CCD may be used.

The base plate 52 includes a supporting flat plate 52a which supports the image pickup element 51 and the housing 53 on its top surface, and a flexible base plate 52b with its one end portion connected to a bottom surface (a surface at a side opposite to the image pickup element 51) of the supporting flat plate 52a.

Although illustration is omitted, the supporting flat plate 52a includes a number of pads for transmitting signals, and the pads are connected to the image pickup element 51 via wiring (not-shown).

In FIG. 1, as mentioned above, the one end portion of the flexible base plate 52b is connected to the supporting flat plate 52a. Accordingly, the flexible base plate 52b connects the supporting flat plate 52a to an external circuit (for example, a control circuit included in an upper level apparatus in which an image pickup unit is incorporated) via the external connection terminal 54 disposed at the other end of the flexible base plate 52b. With this, the flexible base plate 52b makes it possible to receive the supply of a voltage and clock signals to drive the image pickup element 51 from the external circuit, and to output digital YUV signals to the external circuit.

Furthermore, the longitudinal direction intermediate portion of the flexible base plate 52b is provided with flexibility or deformability. Accordingly, with the deformation, the flexible base plate 52b gives the external connection terminal 54 a degree of freedom in terms of orientation and arrangement relative to the supporting flat plate 52a.

In FIG. 2, the housing 53 is arranged and fixed on the surface of the supporting flat plate 52a of the base plate 52 on which the image pickup element 51 is disposed, in such a way that the housing 53 covers the image pickup element 51. Namely, in the housing 53, its one end portion at the image pickup element 51 side is made open widely such that the housing 53 surrounds the image pickup element 51, and its another end portion (object side end portion) forms a flange portion 53a with a small opening. The above one end portion (image side end portion) at the image pickup element 51 side is brought in contact with the supporting flat plate 52a and fixed on the supporting flat plate 52a. Here, the one end portion of the housing 53 at the image pickup element 51 side may be brought in contact with a peripheral portion around the photoelectric conversion section 51a on the image pickup element 51 and fixed on the peripheral portion.

In the inside of the housing 53 arranged such that the flange portion 53a provided with a small opening (an opening portion to allow light to enter) is disposed to face the object side, an IR (infrared light) cut-off filter F is arranged and fixed between the image pickup lens 10 and the image pickup element 51.

The image pickup lens 10 is composed of, in the order from the object side, the first lens L1, the second lens L2, the third lens L3, the fourth lens L4, and the fifth lens L5. Into respective spaces between adjacent lenses among the lenses L1 through L5, a spacer SP is disposed to maintain a distance between the adjacent lenses. In this regard, the flange configuration of each of the lenses L1 through L5 is adjusted such that adjacent flanges may be brought in contact with each other. It is preferable that all of the lenses L1 through L5 are made of plastic. Incidentally, in FIGS. 1 and 2, an upper side is made into the object side and the lower side is made into the image side.

Although illustration is omitted, at the object side more than the first lens L1, an external light shielding mask may be disposed so as to reduce the entering of unnecessary light from the outside as small as possible. Further, an aperture stop S is a member configured to determine the F-number of the whole system of the image pickup lens. An IR cut-off filter F is a member shaped in, for example, an approximately rectangular shape or a circle configuration. A spacer SP is disposed also at a position between the fifth lens L5 and the IR cut-off filter F and at a position between the IR cut-off filter F and the supporting flat plate 52a.

Figure 3:
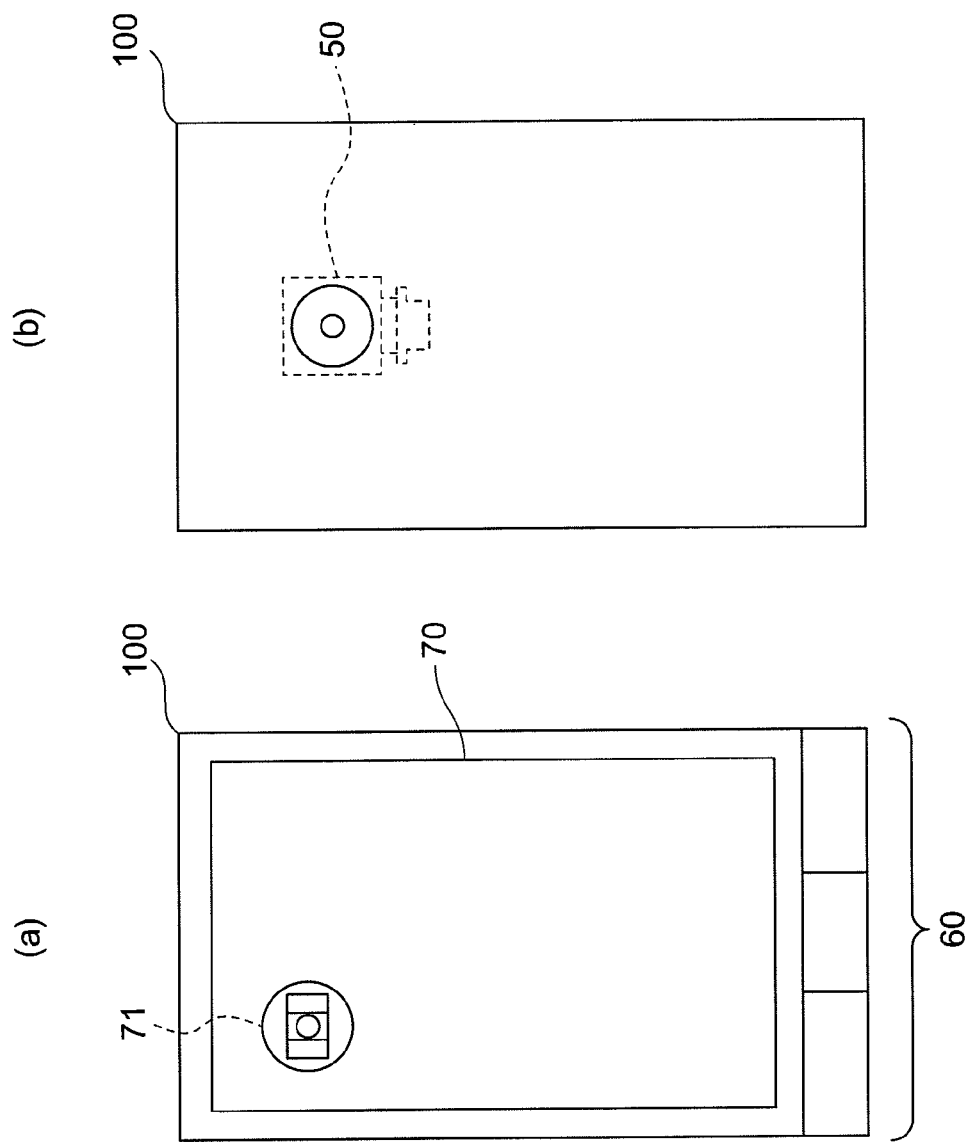
FIG. 3 includes a front view (a) of a mobile terminal (smart phone) to which the image pickup unit is applied, and a back view (b) of the mobile terminal (smart phone) to which the image pickup unit is applied.

Now, description will be given to the actions of the above-mentioned image pickup unit 50. Each of FIGS. 3(a) and 3(b) shows the condition that the image pickup unit 50 is installed in a smart phone 100 as an example of a mobile terminal being a digital device. Further, FIG. 4 is a control block diagram of the smart phone 100.

The image pickup unit 50 is installed such that, for example, the object side end surface of the housing 53 is disposed on the back side (refer to FIG. 3(b)) of the smart phone 100 and arranged at a position corresponding to the bottom side of a liquid crystal display section.

The external connection terminal 54 (an arrowed line in FIG. 4) of the image pickup unit 50 is connected to the control section 101 of the smart phone 100, and is configured to output image signals, such as luminance signals and color difference signals, to the control section 101 side.

Figure 4:
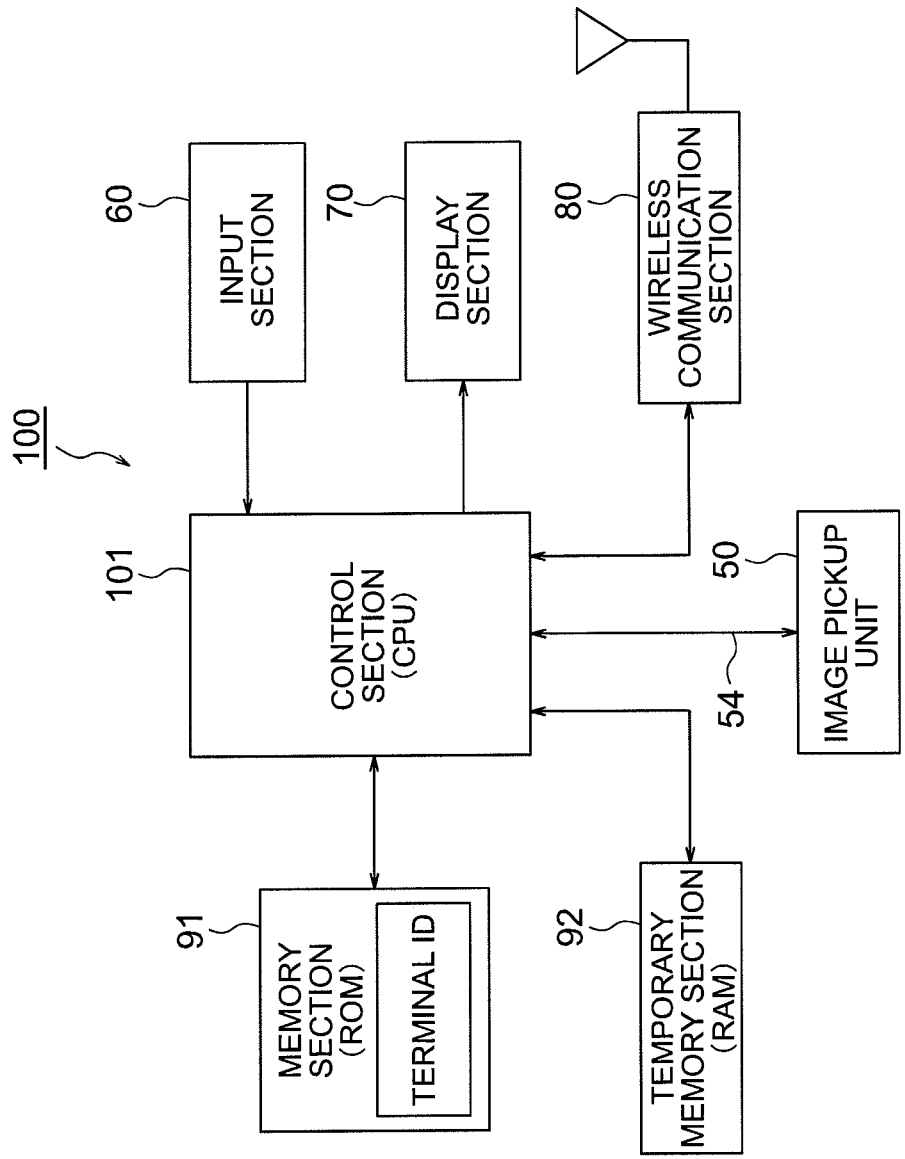
FIG. 4 is a control block diagram of the smart phone shown in FIG. 3.

On the other hand, as shown in FIG. 4, the smart phone 100 includes a control section (CPU) 101 configured to control generally respective sections and to execute a program corresponding to each process; an input section 60 configured to input and instruct a number and the like by a key; a liquid crystal display section 70 configured to display photographed picture image in addition to prescribed data; a wireless communication section 80 configured to realize various kinds of information communications with external servers; a memory section (ROM) 91 configured to memorize a system program of a smart phone 100, various processing programs, and various necessary data, such as, a terminal ID; and a temporary memory section (RAM) 92 configured to be used as a working area which stores temporarily various processing programs and data to be executed by the control section 101, processing data, photographed image data acquired by the image pickup unit 50, and the like.

The smart phone 100 is configured to act via an operation at the input section 60 and to be able to perform photography by actuating the image pickup unit 50 in response a touch operation for icons 71 displayed on the liquid crystal display section 70 serving as a touch panel. The image signals input from the image pickup unit 50 may be memorized in the memory 92 by the control system of the above-mentioned smart phone 100, displayed on the touch panel 70, and transmitted as image information to the outside via the wireless communication section 80.

EXAMPLE

Hereafter, examples of the image pickup lens in relation to the present invention will be shown. Symbols used in each example are as follows.
f: Focal length of the whole system of an image pickup lens
fB: Back focal length
F: F number
2Y: Diagonal length of an image pickup surface of a solid state image pickup element
ENTP: Position of an entrance pupil (distance from the first surface to the position of the entrance pupil)
EXTP: Position of an exit pupil (distance from the image pickup surface to the position of the exit pupil)
H1: Position of a front side principal point (distance from the first surface to the position of the front side principal point)
H2: Position of a back side principal point (distance from the backmost surface to the position of the back side principal point)
R: Curvature radius
D: Distance between surfaces on the optical axis
Nd: Refractive index of a lens material for d-line
vd: Abbe number of a lens material In each example, a surface marked with an asterisk "*" after a surface number is a surface with an aspheric configuration. The configuration of the aspheric surface is expressed by the following expression (Math. 1), where the apex of the surface is defined as the origin, an X-axis is made to extend along the optical axis direction, and h represents the height in a perpendicular direction to the optical axis.

$$X = \frac{h^2/R}{1 + \sqrt{1-(1+K)h^2/R^2}} + \sum A_i h^i \quad \text{[Math. 1]}$$

in the expression, $A_i$ is an i-th order aspheric surface coefficient, R is a curvature radius, and K is a conic constant.

Example 1

The lens data of Example 1 are shown in Table 1. Here, in the following data (including the lens data in a Table), the power of 10 (for example, 2.5×10-02) will be expressed by using "E" (for example, 2.5E-02).

TABLE 1

| Example 1 |
| --- |
| f = 2.69 mm  fB = 0.31 mm  F = 2.07  2Y = 5.744 mm |
| ENTP = 0 mm  EXTP = −1.75 mm  H1 = −0.83 mm |
| H2 = −2.38 mm |

| S.N. | R (mm) | D (mm) | Nd | vd | E.R. (mm) |
| --- | --- | --- | --- | --- | --- |
| 1(s) | ∞ | −0.12 | | | 0.65 |
| 2* | 1.274 | 0.35 | 1.54470 | 56.2 | 0.68 |
| 3* | 3.062 | 0.19 | | | 0.70 |
| 4* | 4.790 | 0.15 | 1.63470 | 23.9 | 0.72 |
| 5* | 2.497 | 0.17 | | | 0.77 |
| 6* | 5.798 | 0.33 | 1.54470 | 56.2 | 0.94 |
| 7* | −15.626 | 0.49 | | | 1.02 |
| 8* | −29.375 | 0.49 | 1.54470 | 56.2 | 1.27 |
| 9* | −0.874 | 0.33 | | | 1.51 |
| 10* | −1.771 | 0.20 | 1.54470 | 56.2 | 2.36 |
| 11* | 1.255 | 0.32 | | | 2.55 |
| 12 | ∞ | 0.11 | 1.51630 | 64.1 | 3.00 |
| 13 | ∞ | | | | 3.00 |

| Aspheric surface coefficients |
| --- |

Second surface

K = 0.19309E+00
A4 = 0.22473E−02
A6 = 0.29308E−01
A8 = −0.59255E−01
A10 = 0.73327E−01
A12 = −0.32043E−01
A14 = −0.35381E+00

Third surface

K = −0.34396E+01
A4 = −0.61510E−01
A6 = 0.72211E−01
A8 = −0.41194E+00
A10 = 0.11836E+00
A12 = −0.18779E+00
A14 = 0.53324E−01

Fourth surface

K = −0.30000E+02
A4 = −0.36316E+00
A6 = 0.23409E+00
A8 = −0.45948E+00
A10 = −0.22372E−01
A12 = 0.25067E+00
A14 = 0.86649E+00

Fifth surface

K = −0.30000E+02
A4 = −0.11639E+00
A6 = 0.16202E+00
A8 = −0.35757E−01
A10 = 0.10245E+00
A12 = 0.67246E−01
A14 = 0.32696E+00

Sixth surface

K = 0.28351E+02
A4 = −0.17336E+00
A6 = 0.68158E−01
A8 = 0.62433E−01
A10 = −0.11958E+00
A12 = 0.10039E+00

TABLE 1-continued

Example 1
A14 = −0.26240E−01
Seventh surface

K = 0.00000E+00
A4 = −0.12855E+00
A6 = −0.24363E−01
A8 = 0.14617E−01
A10 = −0.17634E−02
A12 = −0.17789E−01
A14 = 0.43706E−01
Eighth surface K = 0.30000E+02
A4 = −0.12668E+00
A6 = 0.56584E−01
A8 = −0.35411E−01
A10 = −0.75902E−02
A12 = 0.19834E−02
A14 = 0.28411E−03
Ninth surface K = −0.34375E+01
A4 = −0.10516E+00
A6 = 0.74277E−01
A8 = −0.43961E−02
A10 = −0.21819E−02
A12 = −0.11086E−02
A14 = 0.23261E−03
Tenth surface K = −0.10249E+02
A4 = −0.74158E−01
A6 = 0.29908E−01
A8 = −0.14096E−02
A10 = −0.98587E−03
A12 = 0.18415E−03
A14 = −0.98981E−05
Eleventh surface K = −0.94701E+01
A4 = −0.62588E−01
A6 = 0.22518E−01
A8 = −0.56522E−02
A10 = 0.56121E−03
A12 = −0.10238E−04
A14 = −0.69093E−06

Single lens data

| Lens | Forefront Surface | Focal length(mm) |
|---|---|---|
| 1 | 2 | 3.746 |
| 2 | 4 | −8.434 |
| 3 | 6 | 7.806 |
| 4 | 8 | 1.643 |
| 5 | 10 | −1.318 |

Note:
Hereafter, in each table, "S.N." is a surface number, "E.R." is an effective radius, and "s" is an aperture stop.

Figure 5:
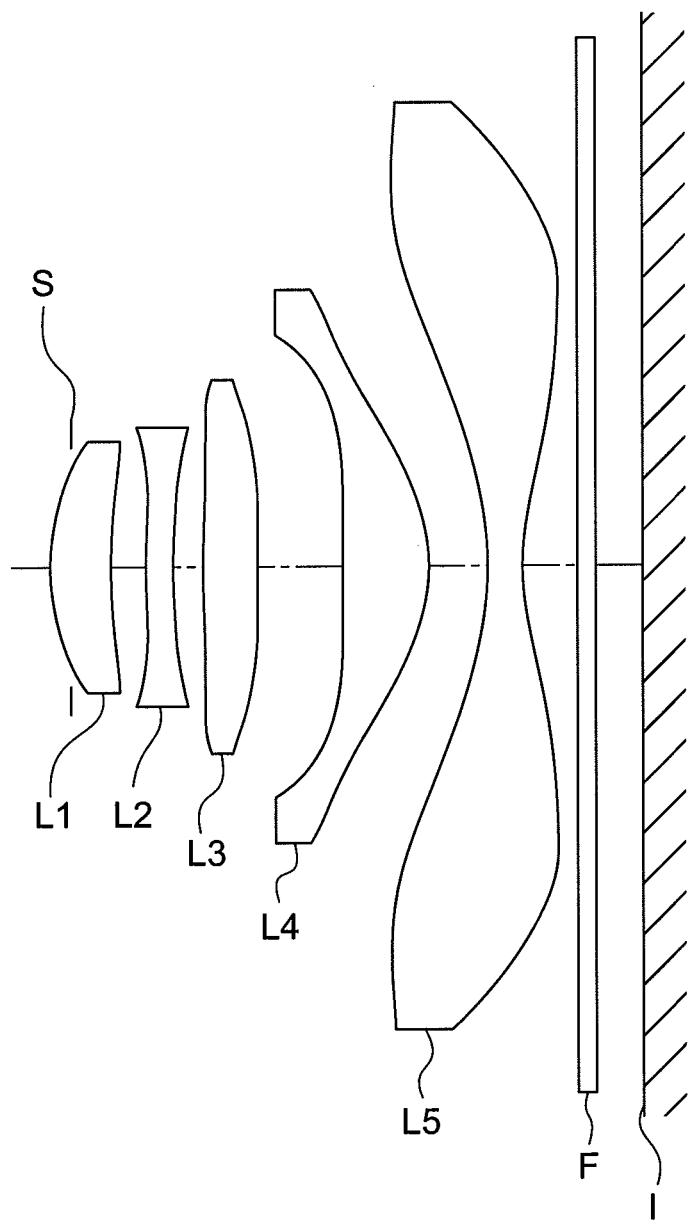
FIG. 5 is an optical axis direction cross sectional view of the image pickup lens of Example 1.

FIG. 5 is a cross sectional view of the lens of Example 1. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 6 shows aberration diagrams (spherical aberration (a), astigmatism (b), distortion (c), and meridional comatic aberration (d)) of Example 1. Here, in the following aberration diagrams, in the spherical aberration diagram, a solid line represents d-line and a dotted line represents g-line, in the astigmatic diagram, a solid line S represents a sagittal image surface for d-line, and a dotted line M represents a meridional image surface for d-line, and the distortion aberration diagram shows a distortion curve for d-line. When each lens is viewed in terms of a paraxial surface configuration, the first lens L1 has a meniscus configuration with a convex surface facing the object side, the second lens L2 has a meniscus configuration with a concave surface facing the image side, the third lens L3 has a biconvex configuration, the fourth lens L4 has a meniscus configuration with a convex surface facing the image side, and the fifth lens L5 has a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

Example 2

The lens data of the image pickup lens of Example 2 are shown in Table 2.

TABLE 2

Example 2
f = 3.06 mm   fB = 0.3 mm   F = 2.11   2Y = 5.842 mm
ENTP = 0.41 mm   EXTP = −1.58 mm   H1 = −1.5 mm
H2 = −2.76 mm

| S.N. | R (mm) | D (mm) | Nd | νd | E.R. (mm) |
|---|---|---|---|---|---|
| 1* | 1.430 | 0.48 | 1.53050 | 55.7 | 0.87 |
| 2* | 5.276 | 0.04 | | | 0.72 |
| 3(s) | ∞ | 0.07 | | | 0.67 |
| 4* | −5.616 | 0.15 | 1.63470 | 23.9 | 0.80 |
| 5* | −257.073 | 0.29 | | | 0.85 |
| 6* | 5.780 | 0.29 | 1.54470 | 56.2 | 0.92 |
| 7* | ∞ | 0.60 | | | 1.03 |
| 8* | 21.421 | 0.67 | 1.54470 | 56.2 | 1.50 |
| 9* | −1.192 | 0.43 | | | 1.57 |
| 10* | −1.306 | 0.20 | 1.54470 | 56.2 | 2.10 |
| 11* | 1.942 | 0.22 | | | 2.65 |
| 12 | ∞ | 0.11 | 1.51630 | 64.1 | 2.88 |
| 13 | ∞ | | | | 2.91 |

Aspheric surface coefficients

First surface

K = −0.28270E+00
A4 = −0.59882E−02
A6 = 0.48359E−01
A8 = −0.20105E+00
A10 = 0.15775E+00
A12 = 0.15089E−01
A14 = −0.18034E+00
Second surface K = −0.11549E+02
A4 = −0.12756E+00
A6 = 0.30794E−01
A8 = −0.11673E+00
A10 = 0.32402E+00
A12 = −0.33662E+00
A14 = −0.13019E+00
Fourth surface K = 0.28127E+02
A4 = −0.10014E+00
A6 = 0.67757E+00
A8 = −0.59649E+00
A10 = 0.13852E+00
A12 = 0.24086E+00
A14 = −0.45425E+00
Fifth surface

K = 0.30000E+02
A4 = −0.22861E−01

TABLE 2-continued

Example 2
f = 3.06 mm  fB = 0.3 mm  F = 2.11  2Y = 5.842 mm
ENTP = 0.41 mm  EXTP = −1.58 mm  H1 = −1.5 mm
H2 = −2.76 mm A6 = 0.62723E+00
A8 = −0.19049E+00
A10 = −0.36436E+00
A12 = −0.27623E+00
A14 = 0.69293E+00
Sixth surface K = 0.26139E+02
A4 = −0.22902E+00
A6 = 0.48505E−01
A8 = −0.72956E−01
A10 = −0.85241E−02
A12 = −0.27649E−04
A14 = −0.72080E−07
Seventh surface K = 0.00000E+00
A4 = −0.16456E+00
A6 = −0.28190E−01
A8 = 0.87892E−03
A10 = −0.31359E−01
Eighth surface K = 0.21690E+02
A4 = −0.59475E−01
A6 = −0.32895E−01
A8 = 0.32869E−01
A10 = −0.36618E−01
A12 = 0.12717E−01
A14 = −0.16040E−02
Ninth surface K = −0.57366E+01
A4 = −0.16607E+00
A6 = 0.97147E−01
A8 = −0.42192E−01
A10 = 0.40792E−02
A12 = 0.26310E−02
A14 = −0.54658E−03
Tenth surface K = −0.13746E+01
A4 = −0.62379E−01
A6 = 0.37886E−01
A8 = −0.19701E−02
A10 = −0.11630E−02
A12 = 0.17936E−03
A14 = −0.62179E−05
Eleventh surface K = −0.30000E+02
A4 = −0.40572E−01
A6 = 0.16831E−01
A8 = −0.45702E−02
A10 = 0.58626E−03

Single lens data

| Lens | Forefront Surface | Focal length (mm) |
|---|---|---|
| 1 | 1 | 3.546 |
| 2 | 4 | −9.047 |
| 3 | 6 | 10.611 |
| 4 | 8 | 2.096 |
| 5 | 10 | −1.403 |

Figure 7:
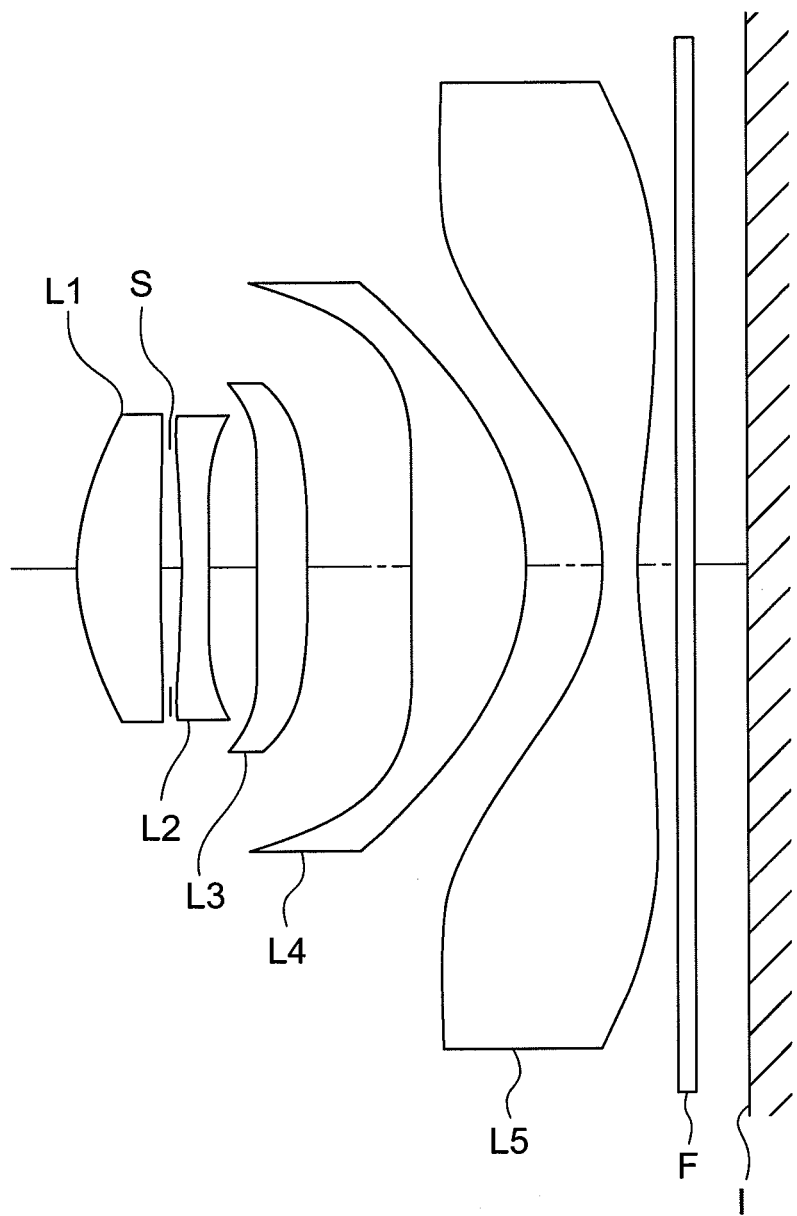
FIG. 7 is an optical axis direction cross sectional view of the image pickup lens of Example 2.

FIG. 7 is a cross sectional view of the lens of Example 2. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 8 shows aberration diagrams (spherical aberration (a), astigmatism (b), distortion (c), and meridional comatic aberration (d)) of Example 2. When each lens is viewed in terms of a paraxial surface configuration, the first lens L1 includes a meniscus configuration with a convex surface facing the object side, the second lens L2 includes a meniscus configuration with a concave surface facing the object side, the third lens L3 includes a plane-convex configuration with a convex surface facing the object side, the fourth lens L4 includes a biconvex configuration, and the fifth lens L5 includes a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

Example 3

The lens data of the image pickup lens of Example 3 are shown in Table 3.

TABLE 3

Example 3
f = 2.72 mm  fB = 0.34 mm  F = 2.07  2Y = 5.842 mm
ENTP = 0 mm  EXTP = −1.6 mm  H1 = −1.09 mm
H2 = −2.38 mm

| S.N. | R (mm) | D (mm) | Nd | νd | E.R. (mm) |
|---|---|---|---|---|---|
| 1(s) | ∞ | −0.13 | | | 0.65 |
| 2* | 1.209 | 0.37 | 1.54470 | 56.2 | 0.66 |
| 3* | 2.356 | 0.15 | | | 0.67 |
| 4* | 2.717 | 0.10 | 1.63200 | 23.4 | 0.68 |
| 5* | 2.379 | 0.22 | | | 0.71 |
| 6* | 6.825 | 0.29 | 1.54470 | 56.2 | 0.88 |
| 7* | ∞ | 0.39 | | | 0.95 |
| 8* | −5.889 | 0.41 | 1.54470 | 56.2 | 1.08 |
| 9* | −0.985 | 0.44 | | | 1.35 |
| 10* | −1.935 | 0.29 | 1.54470 | 56.2 | 1.92 |
| 11* | 1.670 | 0.23 | | | 2.31 |
| 12 | ∞ | 0.11 | 1.51630 | 64.1 | 3.00 |
| 13 | ∞ | | | | 3.00 |

Aspheric surface coefficients

Second surface

K = 0.14226E+00
A4 = −0.90866E−02
A6 = 0.44884E−01
A8 = −0.58034E−01
A10 = 0.42599E−01
A12 = −0.11560E−01
A14 = −0.28356E+00
Third surface K = −0.29007E+01
A4 = −0.57434E−01
A6 = 0.13637E+00
A8 = −0.60899E+00
A10 = 0.23335E+00
A12 = 0.61729E−02
A14 = 0.78308E−01
Fourth surface K = −0.28975E+02
A4 = −0.23625E+00
A6 = 0.28649E+00
A8 = −0.58872E+00
A10 = −0.99998E−02
A12 = 0.24817E+00
A14 = 0.12556E+01

TABLE 3-continued

Example 3
f = 2.72 mm   fB = 0.34 mm   F = 2.07   2Y = 5.842 mm
ENTP = 0 mm   EXTP = −1.6 mm   H1 = −1.09 mm
H2 = −2.38 mm Fifth surface K = −0.30000E+02
A4 = −0.81800E−01
A6 = 0.24363E+00
A8 = −0.37709E−02
A10 = 0.14939E+00
A12 = 0.13676E+00
A14 = 0.46749E+00

Sixth surface

K = −0.30000E+02
A4 = −0.22479E+00
A6 = 0.60326E−01
A8 = 0.11690E+00
A10 = −0.66644E−01
A12 = 0.14491E+00
A14 = −0.11851E+00

Seventh surface

K = 0.00000E+00
A4 = −0.19764E+00
A6 = −0.74046E−01
A8 = 0.42276E−02
A10 = −0.27649E−01
A12 = −0.45738E−01
A14 = 0.91413E−01

Eighth surface

K = 0.76458E+01
A4 = −0.80417E−01
A6 = −0.10934E−01
A8 = −0.44997E−01
A10 = −0.12940E−01
A12 = −0.69681E−02
A14 = −0.13556E−01

Ninth surface

K = −0.30400E+01
A4 = −0.92973E−01
A6 = 0.69451E−01
A8 = −0.36123E−02
A10 = 0.10313E−03
A12 = −0.13341E−02
A14 = −0.28231E−03

Tenth surface

K = −0.31713E+01
A4 = −0.78361E−01
A6 = 0.34428E−01
A8 = −0.10727E−02
A10 = −0.12350E−02
A12 = 0.18923E−03
A14 = −0.86914E−05

Eleventh surface

K = −0.14858E+02
A4 = −0.67131E−01
A6 = 0.22156E−01
A8 = −0.55104E−02
A10 = 0.55303E−03
A12 = −0.22437E−04
A14 = 0.10381E−05

Single lens data

| Lens | Forefront Surface | Focal length (mm) |
|---|---|---|
| 1 | 2 | 4.096 |
| 2 | 4 | −34.130 |
| 3 | 6 | 12.529 |
| 4 | 8 | 2.110 |
| 5 | 10 | −1.601 |

Figure 9:
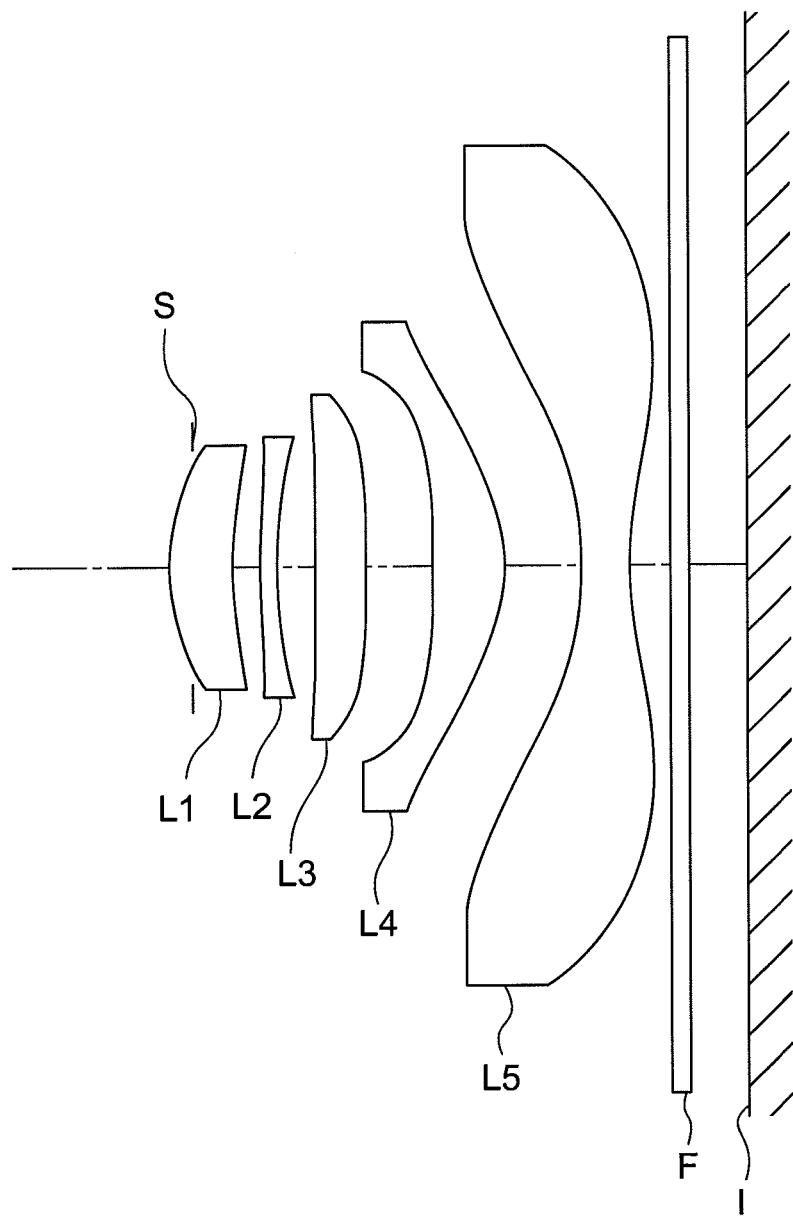
FIG. 9 is an optical axis direction cross sectional view of the image pickup lens of Example 3.

FIG. 9 is a cross sectional view of the lens of Example 3. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 10 shows aberration diagrams (spherical aberration (a), astigmatism (b), distortion (c), and meridional comatic aberration (d)) of Example 3. When each lens is viewed in terms of a paraxial surface configuration, the first lens L1 includes a meniscus configuration with a convex surface facing the object side, the second lens L2 includes a meniscus configuration with a concave surface facing the image side, the third lens L3 includes a plane-convex configuration with a convex surface facing the object side, the fourth lens L4 includes a meniscus configuration with a convex surface facing the image side, and the fifth lens L5 includes a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

Example 4

The lens data of the image pickup lens of Example 4 are shown in Table 4.

TABLE 4

Example 4
f = 3.00 mm   fB = 0.33 mm   F = 2.07   2Y = 5.842 mm
ENTP = 0 mm   EXTP = −1.73 mm   H1 = −1.36 mm
H2 = −2.67 mm

| S.N. | R (mm) | D (mm) | Nd | vd | E.R. (mm) |
|---|---|---|---|---|---|
| 1(s) | ∞ | −0.16 | | | 0.72 |
| 2* | 1.299 | 0.42 | 1.54470 | 56.2 | 0.73 |
| 3* | 3.144 | 0.12 | | | 0.72 |
| 4* | 2.311 | 0.10 | 1.63200 | 23.4 | 0.72 |
| 5* | 1.754 | 0.31 | | | 0.74 |
| 6* | 7.296 | 0.36 | 1.54470 | 56.2 | 1.01 |
| 7* | ∞ | 0.43 | | | 1.09 |
| 8* | −8.843 | 0.46 | 1.54470 | 56.2 | 1.23 |
| 9* | −1.111 | 0.46 | | | 1.49 |
| 10* | −1.956 | 0.35 | 1.54470 | 56.2 | 2.10 |
| 11* | 1.854 | 0.24 | | | 2.44 |
| 12 | ∞ | 0.11 | 1.51630 | 64.1 | 3.00 |
| 13 | ∞ | | | | 3.00 |

Aspheric surface coefficients

Second surface

K = 0.18312E+00
A4 = −0.33301E−02
A6 = 0.48199E−01
A8 = −0.54148E−01
A10 = 0.33117E−01
A12 = 0.29551E−02
A14 = −0.71709E−01

Third surface

K = −0.13502E+02
A4 = −0.69421E−01
A6 = 0.20860E+00
A8 = −0.49218E+00
A10 = 0.28850E+00

TABLE 4-continued

Example 4
f = 3.00 mm  fB = 0.33 mm  F = 2.07  2Y = 5.842 mm
ENTP = 0 mm  EXTP = −1.73 mm  H1 = −1.36 mm
H2 = −2.67 mm A12 = −0.15799E+00
A14 = 0.78309E−01
Fourth surface K = −0.30000E+02
A4 = −0.21043E+00
A6 = 0.33664E+00
A8 = −0.49286E+00q
A10 = 0.40548E−01
A12 = −0.13711E−01
A14 = 0.40709E+00
Fifth surface K = −0.17451E+02
A4 = −0.38955E−04
A6 = 0.23609E+00
A8 = −0.10635E+00
A10 = −0.34232E−02
A12 = −0.12761E−01
A14 = 0.33661E+00
Sixth surface K = −0.13938E+02
A4 = −0.13068E+00
A6 = 0.37036E−01
A8 = 0.71955E−01
A10 = −0.11620E+00
A12 = 0.13212E+00
A14 = −0.47891E−01
Seventh surface K = 0.00000E+00
A4 = −0.11372E+00
A6 = −0.53608E−01
A8 = 0.22208E−01
A10 = −0.61424E−02
A12 = −0.32273E−01
A14 = 0.38925E−01
Eighth surface K = 0.27115E+02
A4 = −0.53709E−01
A6 = 0.12296E−01
A8 = −0.24448E−01
A10 = −0.10392E−01
A12 = 0.19262E−02
A14 = −0.15043E−02
Ninth surface K = −0.31690E+01
A4 = −0.68196E−01
A6 = 0.52455E−01
A8 = −0.76721E−02
A10 = 0.38206E−03
A12 = −0.76083E−03
A14 = 0.76955E−04
Tenth surface K = −0.43907E+01
A4 = −0.84990E−01
A6 = 0.34018E−01
A8 = −0.10199E−02
A10 = −0.12070E−02
A12 = 0.19362E−03
A14 = −0.84653E−05
Eleventh surface K = −0.13872E+02
A4 = −0.63636E−01
A6 = 0.22240E−01
A8 = −0.54156E−02
A10 = 0.52780E−03
A12 = −0.23713E−04
A14 = 0.14559E−05

TABLE 4-continued

Example 4
f = 3.00 mm  fB = 0.33 mm  F = 2.07  2Y = 5.842 mm
ENTP = 0 mm  EXTP = −1.73 mm  H1 = −1.36 mm
H2 = −2.67 mm Single lens data

| Lens | Forefront Surface | Focal length (mm) |
|---|---|---|
| 1 | 2 | 3.764 |
| 2 | 4 | −12.368 |
| 3 | 6 | 13.395 |
| 4 | 8 | 2.286 |
| 5 | 10 | −1.693 |

Figure 11:
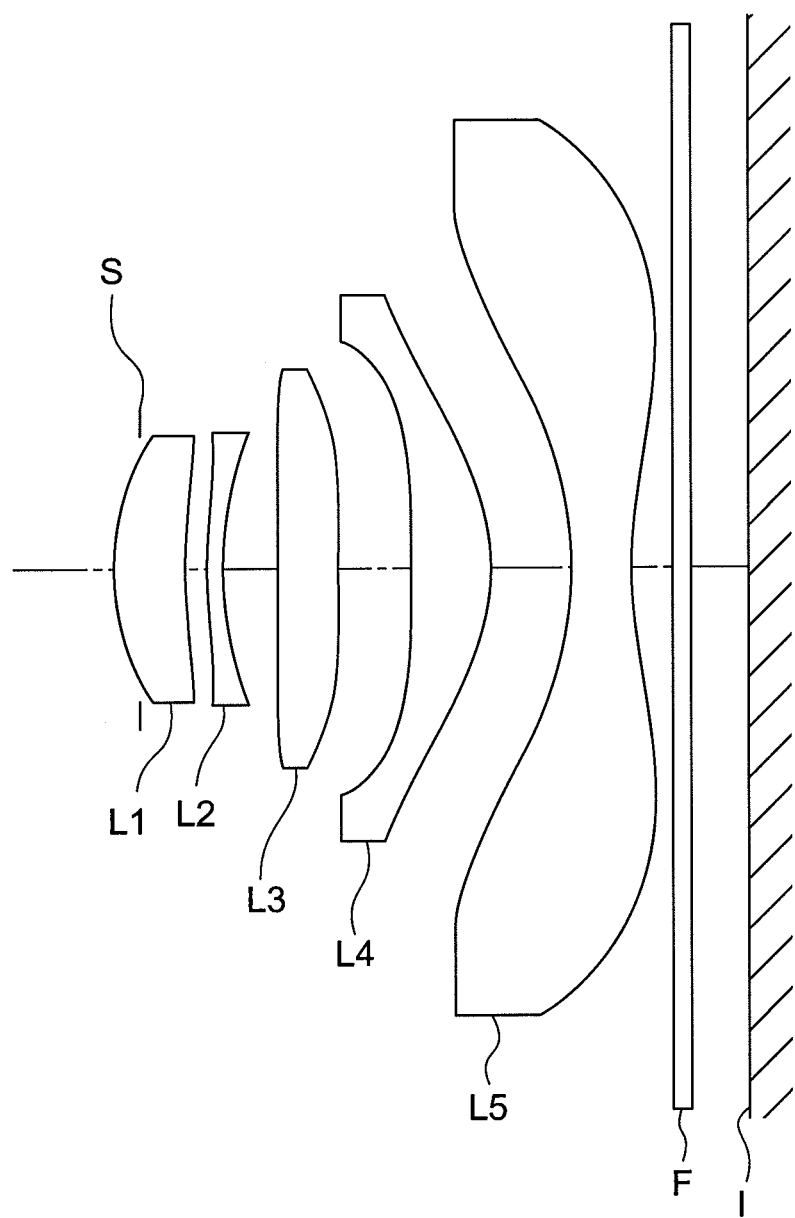
FIG. 11 is an optical axis direction cross sectional view of the image pickup lens of Example 4.

FIG. 11 is a cross sectional view of the lens of Example 4. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 12 shows aberration diagrams (spherical aberration (a), astigmatism (b), distortion (c), and meridional comatic aberration (d)) of Example 4. When each lens is viewed in terms of a paraxial surface configuration, the first lens L1 includes a meniscus configuration with a convex surface facing the object side, the second lens L2 includes a meniscus configuration with a concave surface facing the image side, the third lens L3 includes a plane-convex configuration with a convex surface facing the object side, the fourth lens L4 includes a meniscus configuration with a convex surface facing the image side, and the fifth lens L5 includes a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

Example 5

The lens data of the image pickup lens of Example 5 are shown in Table 5.

TABLE 5

Example 5
f = 2.59 mm  fB = 0.25 mm  F = 2.00  2Y = 5.744 mm
ENTP = 0.4 mm  EXTP = −1.4 mm  H1 = −1.07 mm
H2 = −2.34 mm

| S.N. | R (mm) | D (mm) | Nd | νd | E.R. (mm) |
|---|---|---|---|---|---|
| 1* | 1.105 | 0.46 | 1.48700 | 70.2 | 0.77 |
| 2* | 4.364 | 0.03 | | | 0.62 |
| 3(s) | ∞ | 0.06 | | | 0.57 |
| 4* | −9.075 | 0.13 | 1.84700 | 23.8 | 0.62 |
| 5* | −321.421 | 0.18 | | | 0.60 |
| 6* | 6.484 | 0.23 | 1.75680 | 50.2 | 0.84 |
| 7* | ∞ | 0.59 | | | 0.91 |
| 8* | −3.522 | 0.40 | 1.83400 | 37.2 | 1.13 |
| 9* | −1.259 | 0.35 | | | 1.35 |
| 10* | −2.127 | 0.20 | 1.60360 | 41.7 | 1.58 |
| 11* | 1.574 | 0.20 | | | 2.12 |
| 12 | ∞ | 0.11 | 1.51630 | 64.1 | 3.20 |
| 13 | ∞ | | | | 3.20 |

TABLE 5-continued

Example 5
f = 2.59 mm   fB = 0.25 mm   F = 2.00   2Y = 5.744 mm
ENTP = 0.4 mm   EXTP = −1.4 mm   H1 = −1.07 mm
H2 = −2.34 mm Aspheric surface coefficients First surface K = −0.40821E+00
A4 = −0.68403E−03
A6 = −0.20770E−01
A8 = −0.13529E+00
A10 = −0.96080E−01
A12 = −0.52468E+00
A14 = 0.11060E+00

Second surface

K = 0.79077E+00
A4 = −0.20390E+00
A6 = −0.89235E−01
A8 = −0.26229E−01
A10 = 0.44673E+00
A12 = −0.45744E+00
A14 = −0.11664E+01

Fourth surface

K = −0.27747E+02
A4 = −0.59587E−01
A6 = 0.88312E+00
A8 = −0.32140E+00
A10 = −0.54071E+00
A12 = 0.19357E+00
A14 = −0.44868E+00

Fifth surface

K = −0.30000E+02
A4 = 0.45058E−01
A6 = 0.10226E+01
A8 = −0.10929E+00
A10 = −0.10227E+01
A12 = 0.48394E+00
A14 = 0.69756E+00

Sixth surface

K = −0.68259E+01
A4 = −0.17446E+00
A6 = 0.73874E−01
A8 = 0.23675E−01
A10 = 0.10847E+00
A12 = −0.24674E−03
A14 = 0.15483E−04

Seventh surface

K = 0.00000E+00
A4 = −0.12703E+00
A6 = 0.26098E−02
A8 = −0.10814E+00
A10 = 0.21787E+00

Eighth surface

K = 0.16852E+01
A4 = −0.74297E−01
A6 = 0.30408E−01
A8 = −0.62619E−01
A10 = −0.79770E−02
A12 = 0.65056E−02
A14 = −0.13617E−01

Ninth surface

K = −0.49110E+01
A4 = −0.13632E+00
A6 = 0.79055E−01
A8 = −0.42665E−01
A10 = 0.86690E−02
A12 = 0.29748E−02
A14 = −0.17116E−02

Tenth surface

K = −0.64136E+00

TABLE 5-continued

Example 5
f = 2.59 mm   fB = 0.25 mm   F = 2.00   2Y = 5.744 mm
ENTP = 0.4 mm   EXTP = −1.4 mm   H1 = −1.07 mm
H2 = −2.34 mm A4 = −0.17839E+00
A6 = 0.40366E−01
A8 = 0.72763E−02
A10 = 0.88630E−04
A12 = −0.41125E−04
A14 = −0.15919E−03

Eleventh surface

K = −0.16861E+02
A4 = −0.99732E−01
A6 = 0.39798E−01
A8 = −0.11923E−01
A10 = 0.19810E−02

Single lens data

| Lens | Forefront Surface | Focal length (mm) |
|---|---|---|
| 1 | 1 | 2.903 |
| 2 | 4 | −11.028 |
| 3 | 6 | 8.568 |
| 4 | 8 | 2.176 |
| 5 | 10 | −1.469 |

Figure 13:
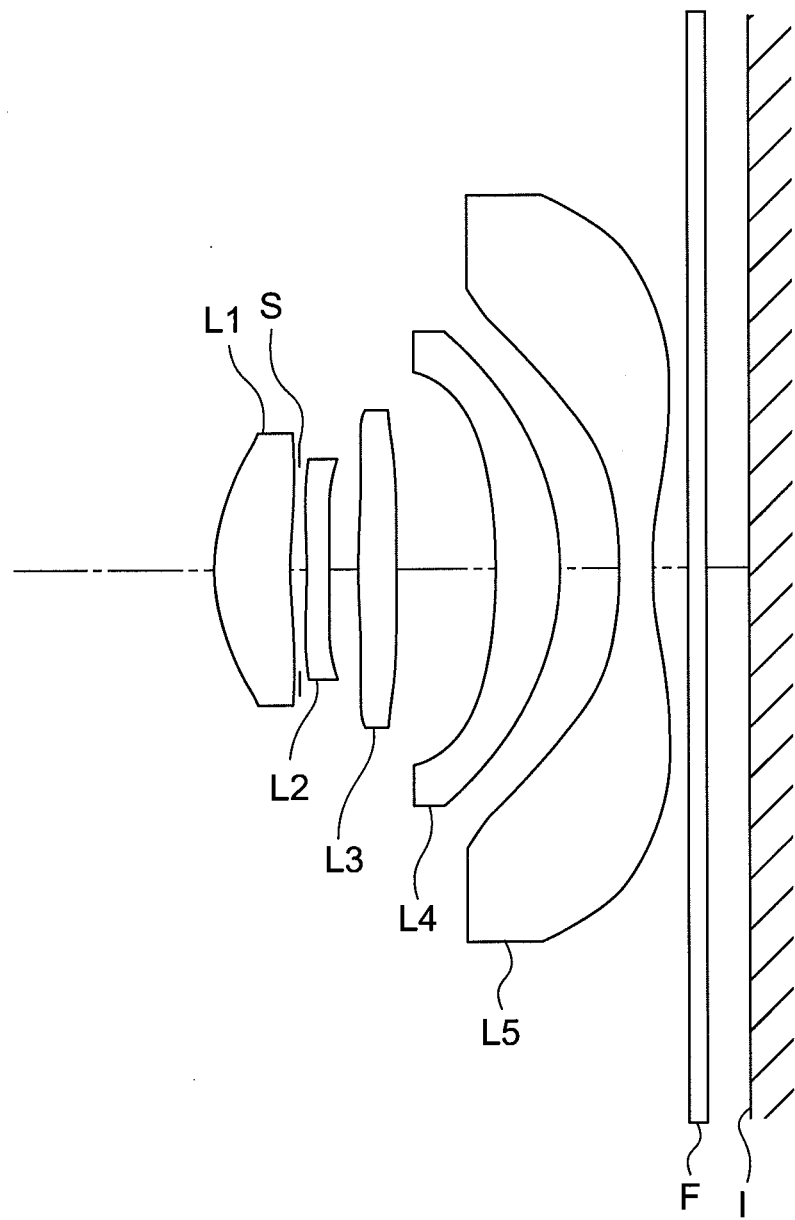
FIG. 13 is an optical axis direction cross sectional view of the image pickup lens of Example 5.

FIG. 13 is a cross sectional view of the lens of Example 5. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 14 shows aberration diagrams (spherical aberration (a), astigmatism (b), distortion (c), and meridional comatic aberration (d)) of Example 5. When each lens is viewed in terms of a paraxial surface configuration, the first lens L1 includes a meniscus configuration with a convex surface facing the object side, the second lens L2 includes a meniscus configuration with a concave surface facing the object side, the third lens L3 includes a plane-convex configuration with a convex surface facing the object side, the fourth lens L4 includes a meniscus configuration with a convex surface facing the image side, and the fifth lens L5 includes a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

Example 6

The lens data of the image pickup lens of Example 6 are shown in Table 6.

TABLE 6

Example 6
f = 2.63 mm   fB = 0.26 mm   F = 2.00   2Y = 5.842 mm
ENTP = 0.41 mm   EXTP = −1.31 mm   H1 = −1.38 mm
H2 = −2.37 mm

| S.N. | R (mm) | D (mm) | Nd | vd | E.R. (mm) |
|---|---|---|---|---|---|
| 1* | 1.090 | 0.46 | 1.49710 | 81.6 | 0.77 |
| 2* | 3.525 | 0.04 | | | 0.63 |
| 3(s) | ∞ | 0.06 | | | 0.60 |

TABLE 6-continued

Example 6
f = 2.63 mm   fB = 0.26 mm   F = 2.00   2Y = 5.842 mm
ENTP = 0.41 mm   EXTP = −1.31 mm   H1 = −1.38 mm
H2 = −2.37 mm

| | | | | | |
|---|---|---|---|---|---|
| 4* | −15.418 | 0.13 | 1.92290 | 20.9 | 0.62 |
| 5* | −438.036 | 0.21 | | | 0.62 |
| 6* | 7.545 | 0.23 | 1.69350 | 53.2 | 0.84 |
| 7* | ∞ | 0.58 | | | 0.91 |
| 8* | −3.879 | 0.40 | 1.83440 | 37.3 | 1.13 |
| 9* | −1.202 | 0.33 | | | 1.36 |
| 10* | −2.256 | 0.20 | 1.73080 | 40.5 | 1.56 |
| 11* | 1.601 | 0.20 | | | 2.07 |
| 12 | ∞ | 0.11 | 1.51630 | 64.1 | 3.20 |
| 13 | ∞ | | | | 3.20 |

Aspheric surface coefficients

First surface

K = −0.36077E+00
A4 = 0.14696E−01
A6 = −0.79039E−01
A8 = 0.33705E−01
A10 = −0.11010E+00
A12 = −0.79935E+00
A14 = 0.34028E+00

Second surface

K = 0.64303E+01
A4 = −0.18135E+00
A6 = −0.18079E+00
A8 = −0.46709E−01
A10 = 0.35848E+00
A12 = 0.27967E−01
A14 = −0.11664E+01

Fourth surface

K = 0.30000E+02
A4 = −0.39369E−01
A6 = 0.61134E+00
A8 = 0.26895E+00
A10 = −0.79799E+00
A12 = 0.19357E+00
A14 = −0.44868E+00

Fifth surface

K = 0.30000E+02
A4 = 0.56980E−01
A6 = 0.69763E+00
A8 = 0.86517E+00
A10 = −0.16959E+01
A12 = 0.48394E+00
A14 = 0.69756E+00

Sixth surface

K = 0.48293E+01
A4 = −0.18112E+00
A6 = 0.64146E−01
A8 = 0.58249E−01
A10 = 0.68093E−01
A12 = −0.39157E−03
A14 = 0.16566E−04

Seventh surface

K = 0.00000E+00
A4 = −0.13628E+00
A6 = 0.35948E−02
A8 = −0.87335E−01
A10 = 0.17530E+00

Eighth surface

K = 0.70719E+00
A4 = −0.63257E−01
A6 = 0.78000E−01
A8 = −0.13508E+00
A10 = 0.36408E−01
A12 = −0.13429E−03
A14 = −0.14652E−01

Ninth surface

K = −0.57530E+01
A4 = −0.13926E+00
A6 = 0.14734E+00
A8 = −0.10044E+00
A10 = 0.14933E−01
A12 = 0.75089E−02
A14 = −0.22119E−02

Tenth surface

K = −0.65865E+00
A4 = −0.11686E+00
A6 = −0.46985E−02
A8 = 0.11808E−01
A10 = 0.14907E−02
A12 = 0.39963E−05
A14 = −0.21735E−03

Eleventh surface

K = −0.19644E+02
A4 = −0.11308E+00
A6 = 0.50606E−01
A8 = −0.18041E−01
A10 = 0.35133E−02

Single lens data

| Lens | Forefront Surface | Focal length (mm) |
|---|---|---|
| 1 | 1 | 2.989 |
| 2 | 4 | −17.319 |
| 3 | 6 | 10.880 |
| 4 | 8 | 1.955 |
| 5 | 10 | −1.254 |

Figure 15:
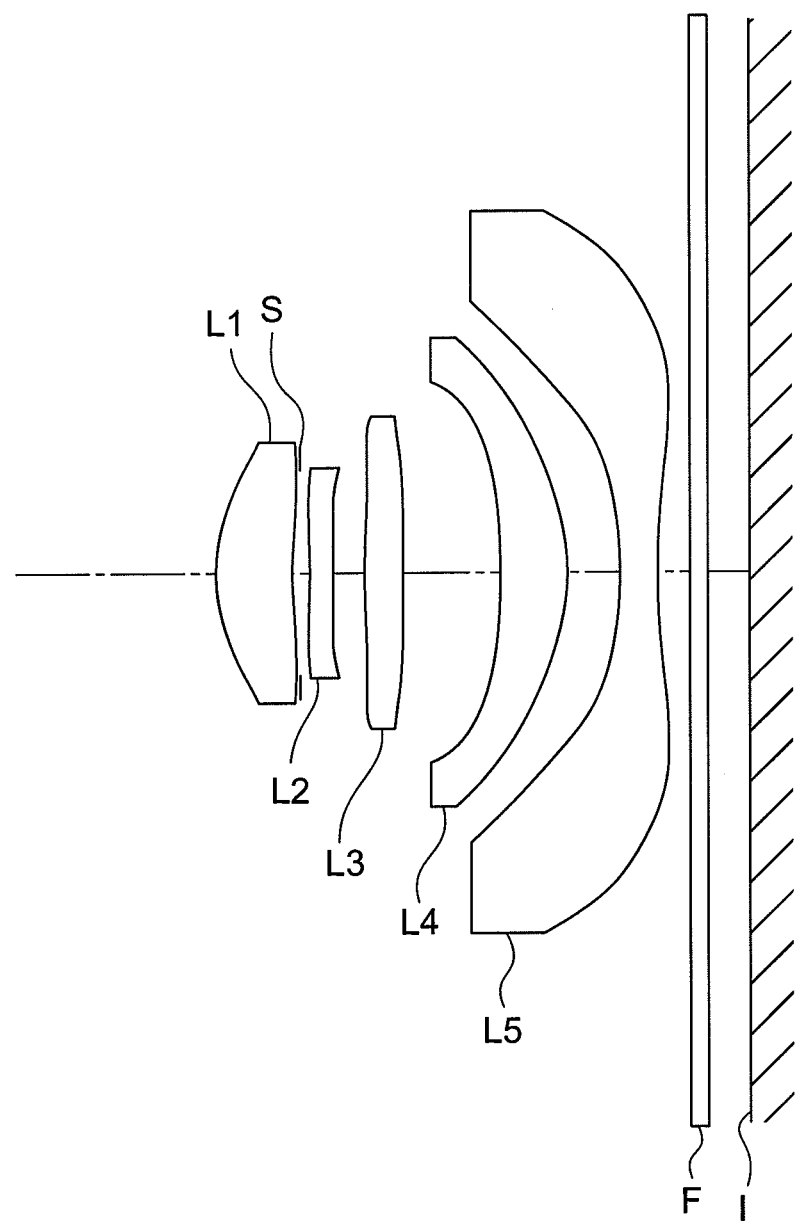
FIG. 15 is an optical axis direction cross sectional view of the image pickup lens of Example 6.

FIG. 15 is a cross sectional view of the lens of Example 6. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 16 shows aberration diagrams (spherical aberration (a), astigmatism (b), distortion (c), and meridional comatic aberration (d)) of Example 6. When each lens is viewed in terms of a paraxial surface configuration, the first lens L1 includes a meniscus configuration with a convex surface facing the object side, the second lens L2 includes a meniscus configuration with a concave surface facing the object side, the third lens L3 includes a plane-convex configuration with a convex surface facing the object side, the fourth lens L4 includes a meniscus configuration with a convex surface facing the image side, and the fifth lens L5 includes a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

Example 7

The lens data of the image pickup lens of Example 7 are shown in Table 7.

TABLE 7

Example 7
f = 2.73 mm   fB = 0.22 mm   F = 2.07   2Y = 5.744 mm
ENTP = 0 mm   EXTP = −2.19 mm   H1 = −0.36 mm
H2 = −2.51 mm

| S.N. | R (mm) | D (mm) | Nd | vd | E.R. (mm) |
|---|---|---|---|---|---|
| 1(s) | ∞ | −0.09 | | | 0.66 |
| 2* | 1.523 | 0.33 | 1.54470 | 56.2 | 0.68 |
| 3* | 4.339 | 0.29 | | | 0.72 |
| 4* | 14.522 | 0.26 | 1.63470 | 23.9 | 0.78 |
| 5* | 3.244 | 0.12 | | | 0.94 |
| 6* | 6.524 | 0.46 | 1.54470 | 56.2 | 1.10 |
| 7* | −5.408 | 0.46 | | | 1.15 |
| 8* | −320.018 | 0.50 | 1.54470 | 56.2 | 1.27 |
| 9* | −0.910 | 0.22 | | | 1.45 |
| 10* | −2.435 | 0.40 | 1.54470 | 56.2 | 2.03 |
| 11* | 1.220 | 0.46 | | | 2.60 |
| 12 | ∞ | 0.11 | 1.51630 | 64.1 | 3.00 |
| 13 | ∞ | | | | 3.00 |

Aspheric surface coefficients

Second surface

K = 0.17299E+00
A4 = 0.39225E−03
A6 = 0.72422E−02
A8 = −0.18208E−01
A10 = −0.44510E−02
A12 = −0.15918E−01
A14 = −0.85866E−01

Third surface

K = −0.48969E+01
A4 = −0.28715E−01
A6 = −0.71064E−02
A8 = −0.79007E−01
A10 = −0.13913E−01
A12 = −0.47716E−01
A14 = −0.57043E−01

Fourth surface

K = −0.30000E+02
A4 = −0.20719E+00
A6 = 0.13465E−01
A8 = −0.10255E+00
A10 = −0.39105E−01
A12 = 0.28575E−01
A14 = 0.12234E+00

Fifth surface

K = −0.25540E+02
A4 = −0.56793E−01
A6 = 0.36521E−01
A8 = −0.32611E−02
A10 = 0.84707E−02
A12 = 0.34368E−02
A14 = 0.15190E−01

Sixth surface

K = 0.26082E+02
A4 = −0.65310E−01
A6 = 0.25176E−01
A8 = 0.94254E−02
A10 = −0.10581E−01
A12 = 0.35365E−02
A14 = −0.11698E−02

Seventh surface

K = 0.00000E+00
A4 = −0.74289E−01
A6 = −0.20912E−01
A8 = −0.51381E−02
A10 = −0.17240E−02
A12 = 0.13156E−02
A14 = 0.51936E−02

Eighth surface

K = −0.30000E+02
A4 = −0.12573E+00

TABLE 7-continued

Example 7
f = 2.73 mm   fB = 0.22 mm   F = 2.07   2Y = 5.744 mm
ENTP = 0 mm   EXTP = −2.19 mm   H1 = −0.36 mm
H2 = −2.51 mm A6 = 0.48828E−02
A8 = −0.98762E−02
A10 = −0.14061E−02
A12 = −0.94013E−03
A14 = −0.19956E−02

Ninth surface

K = −0.33890E+01
A4 = −0.94973E−01
A6 = 0.21802E−01
A8 = 0.29261E−02
A10 = 0.79886E−03
A12 = 0.70437E−04
A14 = −0.45104E−04

Tenth surface

K = −0.77286E+01
A4 = −0.25514E−01
A6 = 0.77578E−02
A8 = −0.14321E−03
A10 = −0.80055E−04
A12 = 0.67604E−05
A14 = −0.29033E−06

Eleventh surface

K = −0.80986E+01
A4 = −0.28302E−01
A6 = 0.51659E−02
A8 = −0.80674E−03
A10 = 0.40335E−04
A12 = −0.29983E−06
A14 = 0.58244E−07

Single lens data

| Lens | Forefront Surface | Focal length (mm) |
|---|---|---|
| 1 | 2 | 4.138 |
| 2 | 4 | −6.641 |
| 3 | 6 | 5.504 |
| 4 | 8 | 1.675 |
| 5 | 10 | −1.436 |

Figure 17:
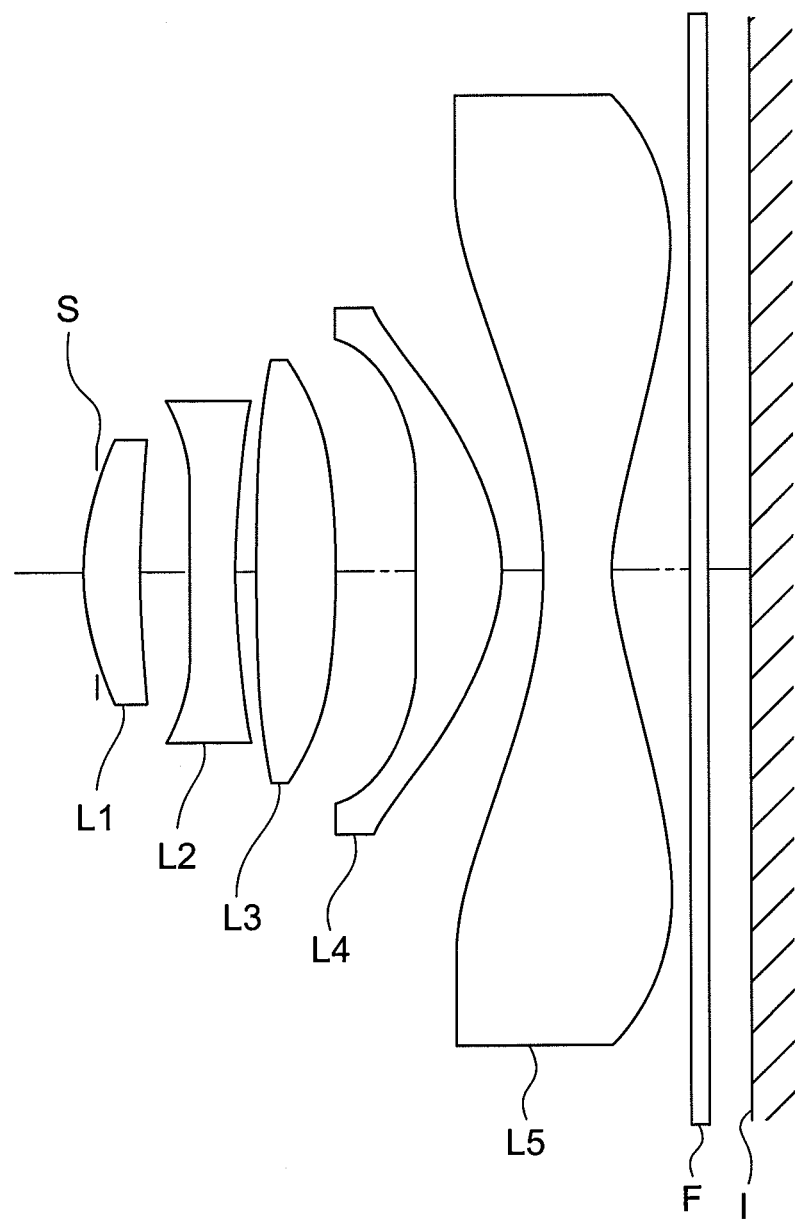
FIG. 17 is an optical axis direction cross sectional view of the image pickup lens of Example 7.

FIG. 17 is a cross sectional view of the lens of Example 7. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 18 shows aberration diagrams (spherical aberration (a), astigmatism (b), distortion (c), and meridional comatic aberration (d)) of Example 7. When each lens is viewed in terms of a paraxial surface configuration, the first lens L1 includes a meniscus configuration with a convex surface facing the object side, the second lens L2 includes a meniscus configuration with a concave surface facing the image side, the third lens L3 includes a biconvex configuration, the fourth lens L4 includes a meniscus configuration with a convex surface facing the image side, and the fifth lens L5 includes a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

Example 8

The lens data of the image pickup lens of Example 8 are shown in Table 8.

TABLE 8

Example 8
f = 2.90 mm   fB = 0.28 mm   F = 2.07   2Y = 5.744 mm
ENTP = 0 mm   EXTP = −2 mm   H1 = −0.8 mm
H2 = −2.63 mm

| S.N. | R (mm) | D (mm) | Nd | νd | E.R. (mm) |
|---|---|---|---|---|---|
| 1(s) | ∞ | −0.12 | | | 0.70 |
| 2* | 1.389 | 0.36 | 1.52500 | 70.4 | 0.74 |
| 3* | 3.804 | 0.29 | | | 0.77 |
| 4* | 10.449 | 0.22 | 1.63470 | 23.9 | 0.80 |
| 5* | 3.115 | 0.13 | | | 0.89 |
| 6* | 4.620 | 0.40 | 1.54470 | 56.2 | 1.04 |
| 7* | −15.607 | 0.50 | | | 1.13 |
| 8* | −16.234 | 0.55 | 1.54470 | 56.2 | 1.29 |
| 9* | −0.657 | 0.14 | | | 1.48 |
| 10* | −1.747 | 0.39 | 1.54470 | 56.2 | 2.04 |
| 11* | 0.846 | 0.47 | | | 2.55 |
| 12 | ∞ | 0.11 | 1.51630 | 64.1 | 3.30 |
| 13 | ∞ | | | | 3.30 |

Aspheric surface coefficients

Second surface

K = 0.12625E+00
A4 = −0.50323E−03
A6 = 0.34257E−02
A8 = −0.16233E−01
A10 = 0.35767E−01
A12 = −0.13076E+00
A14 = −0.41376E−01

Third surface

K = −0.13674E+01
A4 = −0.35923E−01
A6 = −0.25204E−01
A8 = −0.79010E−01
A10 = 0.18030E−01
A12 = −0.16779E+00
A14 = −0.43167E−02

Fourth surface

K = −0.30000E+02
A4 = −0.25599E+00
A6 = 0.56732E−01
A8 = −0.13834E+00
A10 = −0.18581E−01
A12 = 0.15969E+00
A14 = 0.97365E−01

Fifth surface

K = −0.28134E+02
A4 = −0.11698E+00
A6 = 0.53373E−01
A8 = 0.21489E−02
A10 = 0.30889E−01
A12 = 0.13678E−01
A14 = 0.72616E−01

Sixth surface

K = 0.92321E+01
A4 = −0.98682E−01
A6 = 0.26997E−01
A8 = 0.28674E−02
A10 = −0.18807E−01
A12 = 0.28135E−01
A14 = −0.79505E−02

TABLE 8-continued

Example 8
f = 2.90 mm   fB = 0.28 mm   F = 2.07   2Y = 5.744 mm
ENTP = 0 mm   EXTP = −2 mm   H1 = −0.8 mm
H2 = −2.63 mm Seventh surface K = 0.00000E+00
A4 = −0.66081E−01
A6 = −0.90401E−02
A8 = 0.21949E−03
A10 = −0.42795E−03
A12 = −0.36104E−03
A14 = 0.54328E−02

Eighth surface

K = −0.16650E+01
A4 = −0.12671E+00
A6 = 0.36142E−01
A8 = −0.17107E−01
A10 = −0.38307E−02
A12 = 0.43306E−03
A14 = −0.12373E−03

Ninth surface

K = −0.37914E+01
A4 = −0.11711E+00
A6 = 0.56980E−01
A8 = −0.33947E−03
A10 = −0.10186E−02
A12 = −0.36319E−03
A14 = −0.54591E−04

Tenth surface

K = −0.23378E+02
A4 = −0.43130E−01
A6 = 0.12937E−01
A8 = −0.28718E−03
A10 = −0.20406E−03
A12 = 0.17341E−04
A14 = −0.55975E−06

Eleventh surface

K = −0.77226E+01
A4 = −0.37707E−01
A6 = 0.88598E−02
A8 = −0.16079E−02
A10 = 0.10431E−03
A12 = −0.12542E−05
A14 = 0.81508E−07

Single lens data

| Lens | Forefront Surface | Focal length (mm) |
|---|---|---|
| 1 | 2 | 3.965 |
| 2 | 4 | −7.076 |
| 3 | 6 | 6.591 |
| 4 | 8 | 1.242 |
| 5 | 10 | −0.994 |

Figure 19:
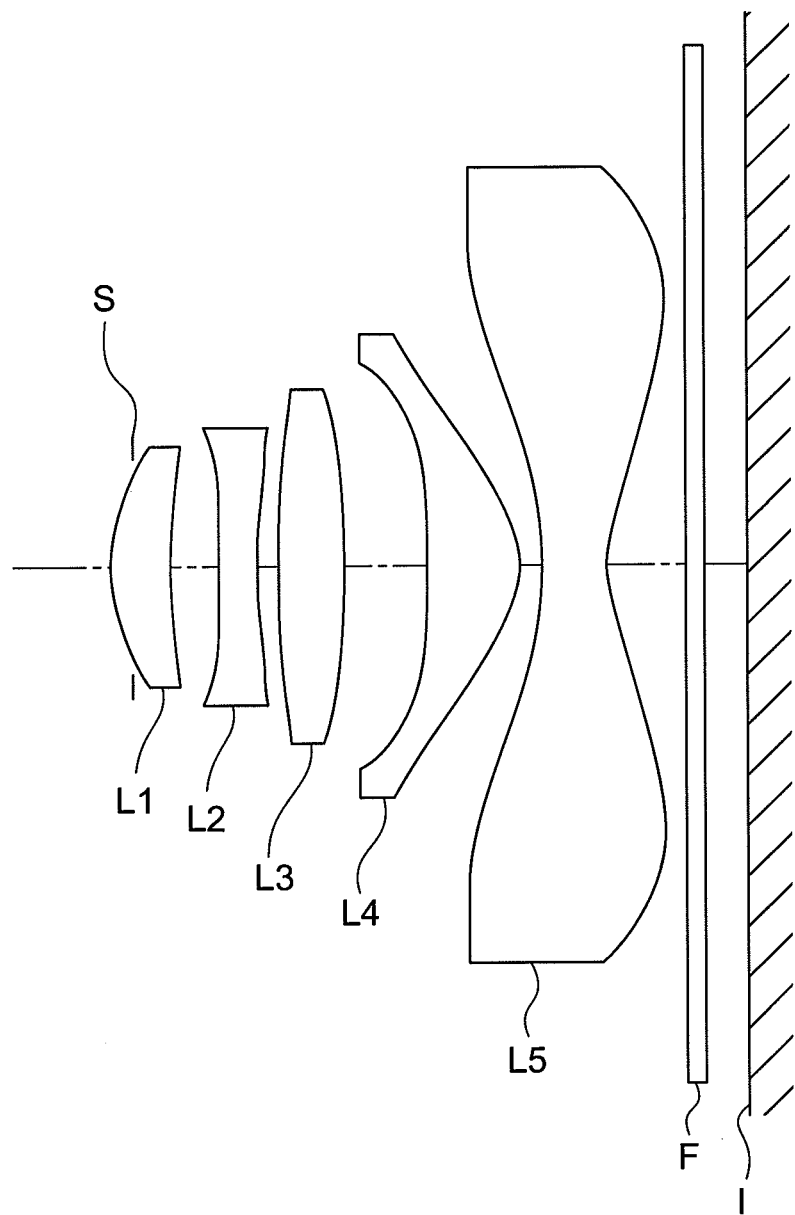
FIG. 19 is an optical axis direction cross sectional view of the image pickup lens of Example 8.

FIG. 19 is a cross sectional view of the lens of Example 8. In the figure, L1 is the first lens with a positive refractive power, L2 is the second lens with a negative refractive power, L3 is the third lens which includes an aspheric surface configuration on at least one side, L4 is the fourth lens with a positive refractive power, L5 is the fifth lens with a negative refractive power, S is an aperture stop, and I is an image pickup surface. Further, F is a parallel flat plate supposed as an optical low pass filter, an IR cut-off filter, a seal glass of a solid state image pickup element, and the like. FIG. 20 shows aberration diagrams (spherical aberration (a), astigmatism (b), distortion (c), and meridional comatic aberration (d)) of Example 8. When each lens is viewed in terms of a paraxial surface configuration, the first lens L1 includes a meniscus configuration with a convex surface facing the object side, the second lens L2 includes a meniscus configuration with a concave surface facing the image side, the third lens L3 includes a biconvex configuration, the fourth lens L4 includes a meniscus configuration with a convex surface facing the image side, and the fifth lens L5 includes a biconcave configuration. In this example, all the lenses are made of a plastic material, and the image side surface of the fifth lens L5 includes an aspheric surface configuration and has an inflection point at a position other than an intersection point with an optical axis. It is preferable that the third lens L3 has a positive refractive power.

The values corresponding to the conditional expressions (1) to (12) in each of Examples are shown in Table 9.

TABLE 9

| | conditional expression | Example 1 | Example 2 | Example 3 | Example 4 | Example 5 | Example 6 | Example 7 | Example 8 |
|---|---|---|---|---|---|---|---|---|---|
| (1) | (r1 + r2)/(r1 − r2) | −2.43 | −1.74 | −3.11 | −2.41 | −1.68 | −1.90 | −2.08 | −2.15 |
| (2) | f1/f | 1.39 | 1.16 | 1.51 | 1.25 | 1.12 | 1.14 | 1.51 | 1.37 |
| (3) | Σ DL13/f | 0.45 | 0.43 | 0.41 | 0.43 | 0.42 | 0.43 | 0.53 | 0.48 |
| (4) | |P2|/P | 0.32 | 0.34 | 0.08 | 0.24 | 0.23 | 0.15 | 0.41 | 0.41 |
| (5) | f4/f | 0.61 | 0.68 | 0.78 | 0.76 | 0.84 | 0.74 | 0.61 | 0.43 |
| (6) | f5/f | −0.49 | −0.46 | −0.59 | −0.56 | −0.57 | −0.48 | −0.53 | −0.34 |
| (7) | ν1 − ν2 | 32.3 | 32.1 | 32.3 | 32.8 | 46.4 | 60.7 | 32.3 | 46.1 |
| (8) | n2 | 1.635 | 1.635 | 1.635 | 1.632 | 1.847 | 1.923 | 1.635 | 1.635 |
| (9) | dL2/f | 0.056 | 0.049 | 0.037 | 0.033 | 0.050 | 0.050 | 0.094 | 0.075 |
| (10) | dL5/f | 0.074 | 0.065 | 0.107 | 0.117 | 0.077 | 0.076 | 0.148 | 0.134 |
| (11) | THL5m/dL5 | 4.45 | 5.95 | 3.28 | 2.97 | 5.12 | 4.76 | 3.00 | 2.90 |
| (12) | L/2Y | 0.59 | 0.65 | 0.56 | 0.62 | 0.54 | 0.54 | 0.66 | 0.66 |

The values corresponding to the conditional expressions (13) to (19) in each of Examples are shown in Table 10.

TABLE 10

| | conditional expression | Example 1 | Example 2 | Example 3 | Example 4 |
|---|---|---|---|---|---|
| (13) | f3/f | 2.90 | 3.47 | 4.61 | 4.47 |
| (14) | f2/f3 | −1.08 | −0.85 | −2.72 | −0.92 |
| (15) | f1/f4 | 2.28 | 1.69 | 1.94 | 1.65 |
| (16) | D2_3/D3_4 | 0.35 | 0.47 | 0.55 | 0.72 |
| (17) | f2/f4 | −5.13 | −4.32 | −16.18 | −5.41 |
| (18) | ν1 − ν2 | 32.3 | 31.8 | 32.8 | 32.8 |
| (19) | n2 | 1.635 | 1.635 | 1.632 | 1.632 |

| | conditional expression | Example 5 | Example 6 | Example 7 | Example 8 |
|---|---|---|---|---|---|
| (13) | f3/f | 3.31 | 4.13 | 2.01 | 2.27 |
| (14) | f2/f3 | −1.29 | −1.59 | −1.21 | −1.07 |
| (15) | f1/f4 | 1.33 | 1.53 | 2.47 | 3.19 |
| (16) | D2_3/D3_4 | 0.30 | 0.35 | 0.25 | 0.26 |
| (17) | f2/f4 | −5.07 | −8.85 | −3.96 | −5.70 |
| (18) | ν1 − ν2 | 46.4 | 60.7 | 32.3 | 46.5 |
| (19) | n2 | 1.847 | 1.923 | 1.635 | 1.635 |

In recent years, in a technique proposed as a method of mounting a number of image pickup apparatuses at low cost, optical elements are subjected to a reflow process (heat treatment) while being placed together with IC chips and other electric components on a base plate on which solder has been made to potting beforehand. Successively, by melting the solder, the electric components and the optical elements are mounted simultaneously on the base plate.

In order to perform the mounting by using such a reflow process, it is necessary to heat the optical elements together with the electric components to about 200 to 260° C. If lenses made of thermoplastic resin are mounted under such a high temperature, there are problems that the lenses may cause heat deformation or color change and their optical performances deteriorate. In a technique proposed as one of the methods to solve the above problems, glass mold lenses excellent in heat resistance performance are used as the optical components so as to attain both the miniaturization and the preservation of the optical performance under high temperature environment. However, since the glass mold lenses are higher in cost than the lenses made of thermoplastic resin, there is a problem that the glass mold lenses cannot respond to a request to decrease the cost of an image pickup apparatus.

Then, as compared with lenses made of a thermoplastic resin, such as a polycarbonate resin and a polyolefin resin, in the case where an energy curable resin is used as the material of the image pickup lens, the lowering of the optical performance of the image pickup lenses made of the energy curable resin at the time of being exposed to a high temperature is small. Accordingly, the image pickup lenses made of the energy curable resin are effective for the reflow process. Further, as compared with glass mold lenses, the image pickup lenses made of the energy curable resin can be produced easily at low cost, which results to attain both the low cost and the mass production capability for an image pickup apparatus incorporating the image pickup lens. Here, the energy curable resin means both a heat curable resin and an ultraviolet curable resin. The plastic lens of the present invention may be made of the above-mentioned energy curable resin.

Incidentally, in each of the above-mentioned examples, the entering angle of the main light rays of a light flux which enters an image pickup surface of a solid state image pickup element is not necessarily designed to be sufficiently small at a peripheral portion of the image pickup surface. However, in the latest technique, with a review in terms of an arrangement of each of color filters and on-chip micro lens arrays in a solid state image pickup element, it becomes possible to reduce shading. In more concrete terms, with the setting that the pitch of the arrangement of each of the color filters and the on-chip micro lens arrays is made slightly smaller relative to the pitch of pixels of the image pickup surface of an image pickup element, the color filters and the on-chip micro lens arrays are made to shift toward the optical axis side of the image pickup lens for each pixel as a portion of each of the above components moves toward a peripheral portion of the image pickup surface. Accordingly, a light flux which enters obliquely can be introduces efficiently into a light receiving portion of each pixel. With this, the shading taking place on the solid state image pickup element can be suppressed to be small. The examples of the present invention are made into the example of the design which intends to realize miniaturization more in response to the relaxation of the above requests.

Moreover, the present invention should not be limited to the embodiments and the examples both described in the specification. That is, it is clear for a person skilled in the art from the embodiments, the examples, and the technical conception described in the specification that the present invention includes the other embodiments, examples and modified examples. For example, even in the case where a dummy lens which does not have a refractive power substantially is disposed additionally, such a case is within a range applicable with the present invention.

INDUSTRIAL APPLICABILITY

The present invention can provide an image pickup lens suitable for a small-sized mobile terminal.

REFERENCE SIGNS LIST

10 Image pickup Lens
50 Image pickup Unit
51 Image pickup element
51a Photo-electric conversion section
52 Base plate
52a Supporting flat plate
52b Flexible base plate
53 Housing
53a Flange portion
54 External connection terminal
55 Aperture stop member
60 Input Section
70 Touch panel
80 Wireless communication section
91 Memory section
92 Temporary memory section
100 Smart phone
101 Control section
I image pickup surface
F Parallel plate
L1 to L5 First to fifth lenses
S Aperture stop

The invention claimed is:

1. An image pickup lens to form an image of an object onto a photoelectric conversion section, comprising, in the order from an object side thereof:
   a first lens which has a positive refractive power and includes a convex surface facing the object side;
   a second lens which has a negative refractive power;
   a third lens which includes an aspheric configuration on at least one surface thereof;
   a fourth lens which has a positive refractive power and includes a convex surface facing an image side; and
   a fifth lens which has a negative refractive power and includes a biconcave configuration, wherein an image-side surface of the fifth lens includes an aspheric configuration and has an inflection point at a position other than an intersection point with an optical axis,
   wherein the following conditional expressions are satisfied:

$$-5.0 < (r1+r2)/(r1-r2) \leq -1.0 \quad (1)$$

$$0.90 < f1/f < 1.70 \quad (2)$$

$$0.35 < \Sigma DL13/f < 0.55 \quad (3)$$

wherein in the above expressions:
   r1 is a radius of curvature of an object side surface of the first lens,
   r2 is a radius of curvature of an image side surface of the first lens,
   f1 is a focal length of the first lens,
   f is a focal length of the whole system of the image pickup lens, and
   $\Sigma DL13$ is a distance on the optical axis from the object side surface of the first lens to the image side surface of the third lens.

2. The image pickup lens described in claim 1, wherein the following conditional expression is satisfied:

$$0.35 < f4/f < 1.00 \quad (5)$$

wherein in the above expression, f4 is a focal length of the fourth lens.

3. The image pickup lens described in claim 1, wherein the following conditional expression is satisfied:

$$-0.70 < f5/f < -0.25 \quad (6)$$

wherein in the above expression, f5 is a focal length of the fifth lens.

4. The image pickup lens described in claim 1, wherein the following conditional expression is satisfied:

$$20 < v1-v2 < 70 \quad (7)$$

wherein in the above expression:
   v1 is an Abbe number of the first lens, and
   v2 is an Abbe number of the second lens.

5. The image pickup lens described in claim 1, wherein the following conditional expression is satisfied:

$$1.60 < n2 < 2.10 \quad (8)$$

wherein in the above expression, n2 is a refractive index of the second lens for d-line.

6. The image pickup lens described in claim 1, wherein the following conditional expression is satisfied:

$$0.02 < dL2/f < 0.11 \quad (9)$$

wherein in the above expression, dL2 is a thickness of the second lens on the optical axis.

7. The image pickup lens described in claim 1, wherein the following conditional expression is satisfied:

$$0.04 < dL5/f < 0.20 \quad (10)$$

wherein in the above expression, dL5 is a thickness of the fifth lens on the optical axis.

8. The image pickup lens described in claim 1, wherein the following conditional expression is satisfied:

$$2.50 < THL5m/dL5 < 6.50 \quad (11)$$

wherein in the above expression:
   THL5m is a maximum thickness of the fifth lens in the optical axis direction, and
   dL5 is a thickness of the fifth lens on the optical axis.

9. The image pickup lens described in claim 1, wherein an aperture stop is arranged at an extreme object side in an image pickup lens group.

10. The image pickup lens described in claim 1, wherein an aperture stop is arranged at a position between the first lens and the second lens.

11. The image pickup lens described claim 1, wherein the image pickup lens includes a lens which does not have a refractive power substantially.

12. An image pickup apparatus, comprising a solid state image pickup element to perform photoelectric conversion for an image of an object, and the image pickup lens described in claim 1.

13. A mobile terminal, comprising the image pickup apparatus described in claim 12.

14. An image pickup lens to form an image of an object onto a photoelectric conversion section, comprising, in the order from an object side thereof:
   a first lens which has a positive refractive power and includes a convex surface facing the object side;

a second lens which has a negative refractive power;
a third lens which has a positive refractive power;
a fourth lens which has a positive refractive power and includes a convex surface facing an image side; and
a fifth lens which has a negative refractive power and includes a concave surface facing an image side, wherein an image side surface of the fifth lens includes an aspheric configuration and has an inflection point at a position other than an intersection point with an optical axis,
wherein the following conditional expression is satisfied:

$$0.05<|P2|/P<0.55 \qquad (4),$$

wherein in the above expression:
P2 is a refractive power of the second lens, and
P is a refractive power of the whole system of the image pickup lens.

15. An image pickup lens to form an image of an object onto an image pickup surface of an image pickup element, comprising, in the order from an object side thereof:
a first lens which has a positive refractive power and includes a convex surface facing the object side;
a second lens which has a negative refractive power;
a third lens which has a positive refractive power;
a fourth lens which has a positive refractive power and includes a convex surface facing an image side; and
a fifth lens which has a negative refractive power and includes a biconcave configuration, wherein an image side surface of the fifth lens includes an aspheric configuration and has an inflection point at a position other than an intersection point with an optical axis,
wherein the following conditional expressions (13) and (14) are satisfied:

$$1.8<f3/f<10.0 \qquad (13)$$

$$-5.0<f2/f3<-0.70 \qquad (14)$$

wherein in the above expressions:
f is a focal length of the whole system of the image pickup lens,
f2 is a focal length of the second lens, and
f3 is a focal length of the third lens.

16. The image pickup lens described in claim 15, wherein the following conditional expression (15) is satisfied:

$$1.2<f1/f4<4.0 \qquad (15)$$

wherein in the above expression:
f1 is a focal length of the first lens, and
f4 is a focal length of the fourth lens.

17. The image pickup lens described in claim 15, wherein the following conditional expression (16) is satisfied:

$$0.15<D2\_3/D3\_4<0.85 \qquad (16)$$

wherein in the above expression:
D2_3 is an air space distance on the optical axis between the second lens and the third lens, and
D3_4 is an air space distance on the optical axis between the third lens and the fourth lens.

18. The image pickup lens described in claim 15, wherein the following conditional expression (17) is satisfied:

$$-25<f2/f4<-3 \qquad (17)$$

wherein in the above expression, f4 is a focal length of the fourth lens.

19. The image pickup lens described in claim 15, wherein the following conditional expression (18) is satisfied:

$$20<v1-v2<70 \qquad (18)$$

wherein in the above expression:
v1 is an Abbe number of the first lens, and
v2 is an Abbe number of the second lens.

20. The image pickup lens described in claim 15, wherein the following conditional expression is satisfied:

$$1.60<n2<2.10 \qquad (19)$$

wherein in the above expression, n2 is a refractive index of the second lens for d-line.

21. An image pickup apparatus, comprising the image pickup lens described in claim 15 and an image pickup element to convert an optical image formed on an image pickup surface into electric signals, wherein the image pickup lens is disposed such that an optical image of an object is formed on an image pickup surface of the image pickup element.

22. A digital device, comprising the image pickup apparatus described in claim 21, whereby at least one function of static image photography and video photography for a photographic object is added.

* * * * *